US006342963B1

(12) United States Patent
Yoshino

(10) Patent No.: US 6,342,963 B1
(45) Date of Patent: Jan. 29, 2002

(54) OPTICAL SCANNING APPARATUS CAPABLE OF CORRECTING POSITIONAL SHIFTS CONTAINED IN PLURAL IMAGES TO BE SYNTHESIZED

(75) Inventor: Kazuhiro Yoshino, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/455,458

(22) Filed: Dec. 6, 1999

(30) Foreign Application Priority Data

Dec. 16, 1998 (JP) .......................................... 10-358302

(51) Int. Cl.$^{7}$ ............................................... G02B 26/08

(52) U.S. Cl. ....................... 359/204; 359/216; 347/235; 250/234

(58) Field of Search ................................ 359/196, 204, 359/212, 216, 217, 218, 219; 250/234, 235, 236; 347/233, 234, 235

(56) References Cited

U.S. PATENT DOCUMENTS 4,310,757 A * 1/1982 Check, Jr. et al. .......... 359/217
5,302,973 A * 4/1994 Costanza et al. ........... 347/235
5,933,182 A * 8/1999 Appel ........................ 359/216

FOREIGN PATENT DOCUMENTS

JP 5-183698 7/1993
JP 2748971 2/1998

* cited by examiner

*Primary Examiner*—Darren Schuberg
(74) *Attorney, Agent, or Firm*—Oliff & Berridge, PLC

(57) ABSTRACT

In an optical scanning apparatus used in an image forming apparatus for scanning a plurality of optical beams on photosensitive members and for synthesizing a plurality of images formed on the photosensitive members to output a synthesized image as a single image, positional shifts occurred in the plural images can be corrected in a simple arrangement and in low cost. The optical scanning apparatus is arranged by a light source for projecting plural optical beams; deflecter for deflecting the optical beams; first beam sensor for sensing positions of the respective optical beams along an optical beam scanning direction; second beam sensor for sensing positions of the respective optical beams along a direction intersected with the scanning direction; and modulation controller for controlling a modulation of each of the plural optical beams projected from the light source based upon the sense results obtained from the first beam sensor and the second beam sensor in such a manner that a positional shift occurred when plural images formed by the respective optical beams are synthesized with each other is suppressed.

6 Claims, 16 Drawing Sheets

OPTICAL SCANNING APPARATUS CAPABLE OF CORRECTING POSITIONAL SHIFTS CONTAINED IN PLURAL IMAGES TO BE SYNTHESIZED

BACKGROUND OF THE INVENTION

1. Field of the Invention

The present invention generally relates to an optical scanning apparatus. More specifically, the present invention is directed to such an optical scanning apparatus capable of correcting positional shifts contained in plural images to be synthesized, which is used in an image forming apparatus in which a plurality of optical beams are separately scanned over a photosensitive member, and a plurality of images formed on this photosensitive member are synthesized with each other to output a single synthesized image.

2. Description of the Related Art

Conventionally, images forming apparatuses are used in printers and copying machines. In these image forming apparatuses, optical beams which are modulated in response to images to be formed are scanned over photosensitive members so as to form electrostatic latent images on these photosensitive members, so that desirable images are formed on the photosensitive members. Very recently, since these electronic appliances are manufactured in digital modes and also color modes, the image forming apparatuses with employment of the above-explained structures are widely employed in these digital/color electronic appliances. A color image may be formed in such a manner that, for example, images having different four colors (e.g., C, M, Y, K) are sequentially formed on a photosensitive member, while these four color images are overlapped with each other on a single photosensitive member. However, this color image forming operation would own such a problem that a lengthy time is required until the desirable image is finally formed.

To avoid this problem, a so-called "tandem" type image forming apparatus has been proposed. In this tandem type image forming apparatus, a plurality of photosensitive members are provided, the respective photosensitive members are scanned/exposed at the same time by a plurality of optical beams to form images having different colors from each other on the respective photosensitive members, and then these images having the different colors are overlapped with each other on the same transfer member. As a result, a desirable color image can be formed. Since this tandem type image forming apparatus simultaneously forms the images having the respective colors at the same time, the time required to form the color image can be largely shortened.

However, in this tandem type image forming apparatus, when the images having the different colors are overlapped with each other, these are certain possibilities that the positional shifts are easily produced due to the fluctuations in the optical characteristic of the optical beams corresponding to the respective color images. Also, these positional shifts of these images may be apparently and visually recognized in the color image. Accordingly, the color shifts must be corrected in order to obtain a high grade image. While the image forming apparatus is manufactured, even when the respective components of this image forming apparatus are adjusted so as to cancel the color shifts, if the peripheral environments such as temperatures are varied, then the color shifts are produced due to some reason, for instance, the arranging positions of the optical components.

Japanese Patent No. 2748971 describes the following color shift corrections employed in the tandem type image forming apparatus. That is, the sensor for sensing the positional shifts of the beams are provided in the vicinity of the respective photosensitive drums. The sensor sense the beam positions along the sub-scanning direction so as to control the write timing along the sub-scanning direction, so that the color shifts along the sub-scanning direction can be corrected.

As another color shift correcting method, the following correcting method is known. That is, while the patterns (for example, mark "+") capable of easily being sensed the color shifts are formed on the photosensitive members, these patterns are read out by the image reading apparatus to be sensed the color shifts. Then, the color shifts are corrected by changing the positions of the beams entered into the photosensitive drums by moving the reflection mirrors, or by controlling the write timing along the sub-scanning direction.

However, the conventional color shift correcting method described in Japanese Patent No. 2748971 owns the following drawback. That is, since the sensor for sensing the positional shift amounts along the sub-scanning direction are provided in correspondence with the photosensitive drums, a positional relationship between a newly replaced photosensitive drum and the relevant positional shift-amount sensor must be adjusted when the old photosensitive drum is replaced by this new photosensitive drum. As a result, the replacing work of the photosensitive drum unit becomes cumbersome. Also, since the positional shift-amount sensor are arranged in the vicinity of the photosensitive drums, there is another problem that these positional shift-amount sensors are contaminated by dust and the like.

Also, in the case that the color shifts are sensed based upon the color shift sensing patterns, since the color shift sensing patterns must be formed on the photosensitive drums, the complex control operation is required. Also, the image reading apparatus for reading the color shift sensing patterns is expensive. The image forming apparatus is made in high cost, and furthermore, the overall dimension of this image forming apparatus is increased so as to secure the space for arranging this image reading apparatus.

SUMMARY OF THE INVENTION

The present invention has been made to solve the above-explained problems. This invention provides such an optical scanning apparatus capable of correcting a positional shift contained in a plurality of images with employment of a simple and low-cost arrangement, while these plural images are synthesized with each other to thereby output a synthesized image as a single image.

To achieve the above-explained advantages, an optical scanning apparatus, according to the present invention, is featured by that an optical scanning apparatus used in an image forming apparatus for scanning a plurality of optical beams on photosensitive members and for synthesizing a plurality of images formed on the photosensitive members to output a synthesized image as a single image, the optical scanning apparatus comprising: a light source for projecting the plurality of optical beams; deflector for deflecting the optical beams; first beam sensor for sensing positions of the respective optical beams along an optical beam scanning direction; second beam sensor for sensing positions of the respective optical beams along a direction intersected with the scanning direction; and modulation controller for controlling a modulation of each of the plural optical beams projected from the light source based upon the sense results obtained from the first beam sensor and the second beam sensor in such a manner that a positional shift occurred when a plurality of images formed by the respective optical beams are synthesized with each other is suppressed.

In an image forming apparatus in which the optical scanning apparatus according to the present invention, while a plurality of optical beams may be scanned over the photosensitive members to form a plurality of images, these plural images are synthesized with each other to output the synthesized image as a single image. As a consequence, for example, when these plural images are such image having different colors from each other, these plural images may be synthesized with each other and then the synthesized image becomes a multi-color image (when colors of plural images are K, Y, M, C, a full color image is outputted). It should be noted that a total number of photosensitive members might be basically selected from 1, or plural number. However, when an image forming apparatus is arranged in such a way that a plurality of photosensitive members are provided and images are formed on the respective photosensitive members at the same time by way of a plurality of optical beams (namely, tandem system), the time required to finally output the synthesized image may be preferably shortened. The optical scanning apparatus may comprising a light source for projecting the plurality of optical beams, and the deflector for deflecting the respective optical beams. It should also be noted that a total number of deflector may be basically selected from 1, or plural number. When an optical scanning apparatus is arranged by that a plurality of optical beams are deflected by employing a single deflector, this optical scanning apparatus may be made compact and furthermore, owns such a merit that the complex mechanism (for example, a rotation phase of a motor is controlled).

Also, there may be provided the first beam sensor for sensing the positions of the respective optical beams along an optical beam scanning direction, and the second beam sensor for sensing the positions of the respective optical beams along the direction intersected with the scanning direction. The modulation controller controls the modulation of each of the plural optical beams projected from the light source based upon the sense results obtained from the first beam sensor and the second beam sensor in such a manner that the positional shift occurred when a plurality of images formed by the respective optical beams are synthesized with each other is suppressed.

The positions of the optical beams sensed by the first beam sensor and the second beam sensor are made in correlation with the optical beam irradiation positions on the photosensitive members. As a consequence, the positional shifts of the plural images formed by the respective optical beams along both the optical beam scanning direction and also the direction intersected with this scanning direction may be corrected. If a color image is formed, then a color shift (deviation) may be corrected. Also, in the case that a positional shift is produced in a plurality of images formed by the respective optical beams due to a change in a peripheral environment, there is another change in the positional relationships among these optical beams sensed by either the first beam sensor or the second beam sensor. As a consequence, the positional shift of the images caused by the change in the peripheral environment can also be corrected.

Also, since the positional shifts are indirectly detected by sensing the positions of the respective optical beams in the optical scanning apparatus of the first aspect, the expensive image reading apparatus for reading the color shift sensing patterns are not required to be positioned in the vicinity of the arranging positions of the photosensitive members. As a result, the space defined in the image forming apparatus can be effectively utilized, and furthermore, the cost thereof can be reduced. Also, in the optical scanning apparatus of the present invention, the positional shift-amount sensor need not be employed instead of the image reading apparatus in the vicinity of the arranging positions of the photosensitive members. The replacement of these photosensitive members can be easily carried out.

As a consequence, while a plurality of images are synthesized with each other to output the synthesized image as a single image, the positional shifts contained in the plural images can be corrected with employment of the simple and low-cost arrangement. The optical scanning apparatus may be featured by further comprising: first storage for storing thereinto a first set value indicative of modulation starting timing within one scanning time period of each of the optical beams, the first set value being set in such a manner that while using as a reference such timing when a specific optical beam passes through a predetermined position within an optical beam scanning range, the positional shifts of the plural images along the scanning direction are corrected; and the modulation controller controls the modulation starting timing of each of the optical beams within one scanning time period based upon the first set value stored in the first storage while using as the reference the timing when the specific optical beam passes through the predetermined position. Since the modulation controller controls the modulation starting timing of each of the optical beams within one scanning time period based upon the first set value which is set in such a manner that the positional shifts of the plural images formed by the respective optical beams along the scanning direction are corrected, the positional shifts of the plural images to be synthesized as a single image along the scanning direction can be corrected.

On the other hand, positions of optical beams may be sensed by arranging the following structure. That is, for example, sensors are arranged in an entire range within an optical beam scanning range so as to continuously sense the positions of the optical beams. To the contrary, in such a position sensing case that modulation timing is controlled and a variation in a positional relationship among these optical beams is detected, timing at which the optical beam passes through a certain position within the scanning range may be sensed by an optical sensor arranged at this certain position. Also, since the first beam sensor senses the respective positions of the plural optical beams along the optical beam scanning direction, this first beam sensor may be constituted by such that, for instance, the above-explained optical sensor is provided with respect to each of the optical beams. In this case, the modulation controller controls the modulation starting timing of each of the optical beams within one scanning time period while using as the reference the timing when the specific optical beam passes through the predetermined position. As a consequence, although the optical sensor corresponding to this specific optical beam is required to be arranged in such a way that this optical sensor senses such timing when the optical beam passes through a position equal to an edge portion on the side of the scanning starting position within the scanning range, there is no limitation in the arranging positions as to the optical sensor corresponding to other optical beams.

As a consequence, in particular, even when the optical beams whose scanning directions are different from each other are mixed in the plural optical beams, the respective optical sensor may be arranged in such a manner that, for example, the respective optical sensor corresponding to the respective optical beams are present at the close positions. In this case, the optical scanning apparatus can be made compact. The optical scanning apparatus may be featured by that the modulation controller judges as to whether or not a variation is present in a positional relationship among the respective optical beams along the scanning direction based upon the positions of the optical beams along the scanning direction, sensed by the first beam sensor, and corrects the first set value depending upon the variation in positional relationship. The modulation controller may judge as to whether or not the variation is present in the positional relationship among the respective optical beams along the scanning direction, and corrects the first set value in response to the variation contained in the positional relationship along the scanning directions of the respective optical beams. This first set value is employed so as to control the modulation staring timing of each of the optical beams within one scanning period. As a consequence, even when the positional relationship among the respective optical beams is varied due to variations in the peripheral environment, the positional shifts of the images along the scanning directions can be firmly corrected. The optical scanning apparatus may be featured by that the first aspect is further comprising: second storage for storing thereinto a second set value indicative of modulation starting timing while using one scanning of each of the optical beams as a unit, the second set value being set in such a manner that the positional shifts of the plural images along the direction intersected with the scanning direction are corrected; and the modulation controller controls the modulation starting timing while using one scanning of each of the optical beams as a unit based upon the second set value stored in the second storage, and judges as to whether or not a variation is present in a positional relationship among the respective optical beams along the direction intersected with the scanning direction based upon the positions of the respective optical beams along the direction intersected with the scanning direction, sensed by the second beam sensor, whereby the second set value is corrected in response to the variation contained in the positional relationship. In this case, the modulation controller may control the modulation starting timing while using one scanning of each of the optical beams as a unit based upon the second set value. This second set value is set in such a manner that the positional shifts of the plural images along the direction intersected with the scanning direction are corrected. As a consequence, this optical scanning apparatus can correct the positional shifts of the plural images to be synthesized with each other as a single image along the direction intersected with the scanning direction. Also, in this case, the modulation controller judges as to whether or not the variation is present in the positional relationship among the respective optical beams along the direction intersected with the scanning direction, and corrects the second set value in response to the variation contained in the positional relationship along the direction intersected with the scanning direction of the optical beams.

This second set value is employed so as to control the modulation starting timing while using one scanning of each of the optical beams as a unit. As a consequence, even when the positional relationship among the respective optical beams is varied due to variations in the peripheral environment, the positional shifts of the images along the direction intersected with the scanning direction can be firmly corrected.

BRIEF DESCRIPTION OF THE DRAWINGS

Preferred embodiments of an optical scanning apparatus according to the present invention will be described in detail based on the drawings.

DETAILED DESCRIPTION OF THE PREFERRED EMBODIMENTS

Referring now to drawings, various preferred embodiments of the present invention will be described in detail.

STRUCTURE OF COLOR IMAGE FORMING APPARATUS

Figure 1:
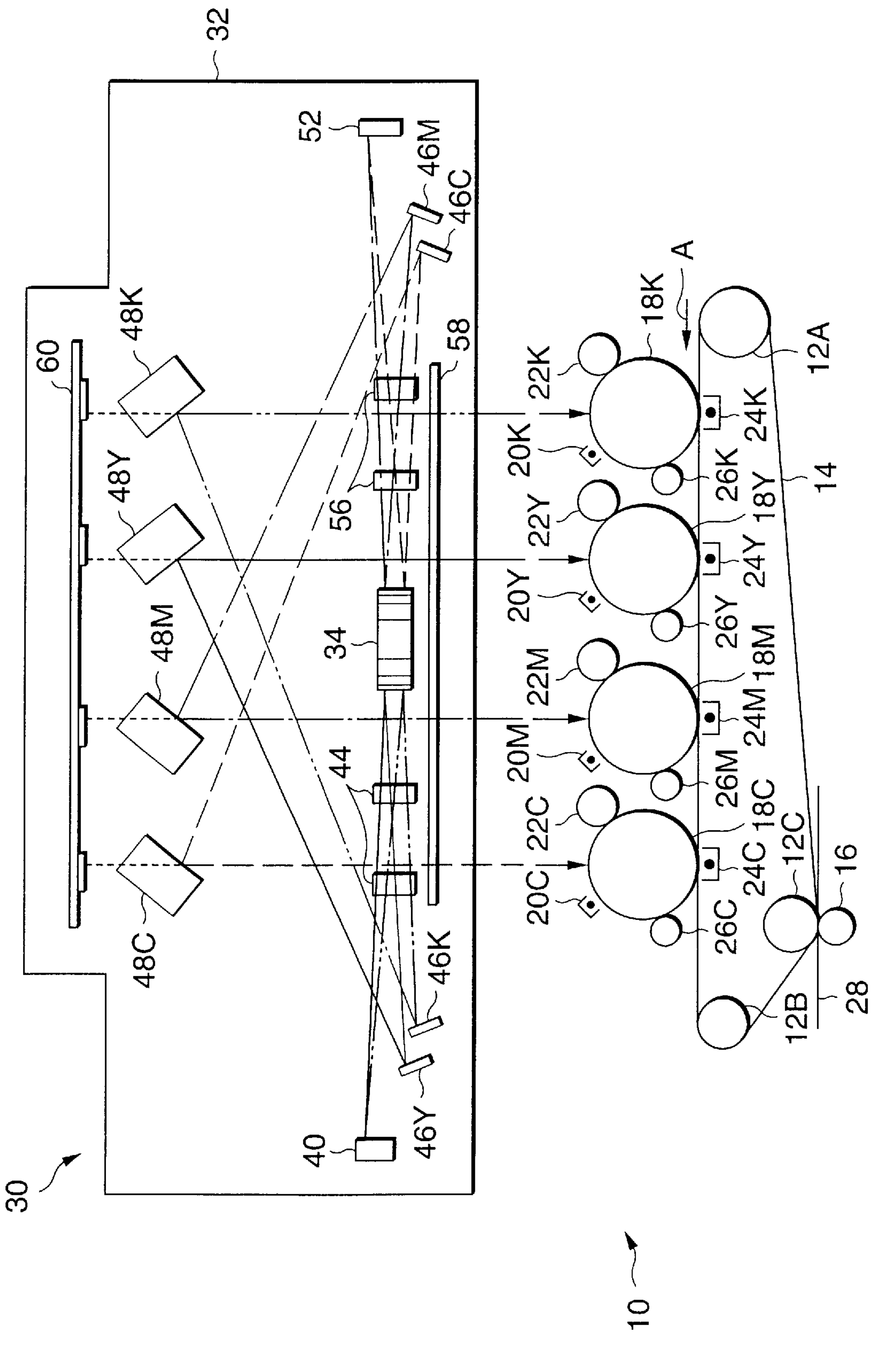
FIG. 1 is a diagram for schematically representing a structure of a color image forming apparatus (and also a plural beam scanning apparatus) according to an embodiment of the present invention.

A color image forming apparatus 10 functioning as an image forming apparatus is indicated in FIG. 1. The color image forming apparatus 10 is provided with 3 sets of feed rollers 12A to 12C, an endless transfer belt 14 wound on these feed rollers 12A to 12C, and a transfer roller 16. This transfer roller 16 is positioned opposite to the feed roller 12C, while sandwiching the transfer belt 14.

Along a moving direction (namely, along an arrow "A" direction shown in FIG. 1) of the transfer belt 14 when this transfer belt 14 is rotatably driven, a photosensitive drum 18K used to form a black (K) image, another photosensitive drum 18Y used to form a yellow (Y) image, another photosensitive drum 18M used to form a magenta (M) image, and a further photosensitive drum 18C used to form a cyan (C) image are arranged in a substantially equi-interval above the transfer belt 14. These photosensitive drums 18 are arranged in such a manner that axial lines of these photosensitive drums 18 are intersected perpendicular to the moving direction of the transfer belt 14.

It should be understood in the below-mentioned description that symbols "K", "Y", "M", and "C" are similarly applied to the reference numerals of the respective components provided with respect to each of these colors K, Y, M, and C for the sake of discrimination.

Charging devices 20 for charging the photosensitive drums 18 are arranged respectively around the respective photosensitive drums 18. A plural beam scanning apparatus 30 corresponding to an optical scanning apparatus according to the present invention (will be explained more in detail) is arranged over the respective photosensitive drums 12. This plural beam scanning apparatus 30 irradiates laser beams to each of these charged photosensitive drums 18 so as to form electrostatic latent images on the respective photosensitive drums 18.

Also, along the rotation direction of the photosensitive drums 18, a developing device 22, a transfer device 24, and a cleaning device 26 are successively arranged around the respective photosensitive drums 18 on a down stream side from the laser beam irradiation positions. The developing device 22 develops an electrostatic latent image formed on the photosensitive drum 18 by using a predetermined color (K, Y, M, or C) toner to form a toner image thereon. The transfer device 24 transfers the toner image formed on the photosensitive drum 18 to the transfer belt 14. The cleaning device 26 removes toners left on the photosensitive drum 18.

The toner images having different colors from each other and formed on the respective photosensitive drums 18 are separately transferred to the transfer belt 14 in such a manner that these different color images are overlapped with each other on the belt surface of this transfer belt 14. As a result, a desirable color toner image is formed on the transfer belt 14, and then the formed color toner image is transferred to a transfer member 28 fed between the feed roller 12C and the transfer roller 16. Then, this transfer member 28 is fed to a fixing apparatus (not shown in FIG. 1), and the transferred toner image is fixed. Accordingly, a desirable color image (full color image) may be formed on the transfer member 28.

STRUCTURE OF PLURAL BEAM SCANNING APPARATUS

Next, the plural beam scanning apparatus 30 will now be described with reference to FIG. 1 and FIG. 2. The plural beam scanning apparatus 30 is equipped with a casing 32 (see also FIG. 3), the bottom shape of which is a substantially rectangular shape. A rotary polygon mirror 34 (corresponding to deflector of the present invention) is arranged at a substantially center portion of the casing 32. The rotary polygon mirror 34 is rotated by a motor (not shown) in a high speed. Along a direction perpendicular to the axial line of the rotary polygon mirror 34, a semiconductor laser (corresponding to light source of the present invention, and will be referred to as an "LD" hereinafter) 36K, and an another semiconductor laser 36Y are arranged in the vicinity of corner portions at one end portion of the casing 32. The semiconductor laser 36K projects laser light irradiated to the photosensitive drum 18K. The semiconductor laser 36Y projects laser light irradiated to the photosensitive drum 18Y.

A collimator lens 38K and a plane mirror 40 are successively arranged on the projection side of the laser beam of the LD (semiconductor laser) 36K. The laser beam K projected from the LD 36K is collimated by the collimator lens 38K, and then the collimated laser beam is entered into the plane mirror 40. Also, a collimator lens 38Y and a plane mirror 42 are successively arranged on the projection side of the laser beam of the LD (semiconductor laser) 36Y. The laser beam Y projected from the LD 36Y is collimated by the collimator lens 38Y, and then the collimated laser beam is entered into the plane mirror 40, after being reflected on the plane mirror 40.

A "fθ" lens 44 is arranged between the plane mirror 40 and the rotary polygon mirror 34. Both the laser beam K and the laser beam Y, which are reflected from the plane mirror 40, pass through the fθ lens 44 and then are entered into the rotary polygon mirror 34. These laser beams K and Y are reflected and deflected on this rotary polygon mirror 34, and thereafter, again pass through the fθ lens 44. This arrangement is so-called as a "double pulse arrangement" (see FIG. 1).

While the position of the LD 36K is different from the position of the LD 36Y along the axial line direction (corresponding to sub-scanning direction) of the rotary polygon mirror 34, both the laser beam K and the laser beam Y are entered into the rotary polygon mirror 34 at different incident angles along the sub-scanning direction. As a result, the laser beams K and Y which have passed through the fθ lens 44 two times are entered into the separate plane mirrors 46K and 46Y.

Then, the laser beam K is entered into a cylindrical mirror 48K arranged at a position corresponding to an upper position of the photosensitive drum 18K by way of the plane mirror 46K, and is projected from the cylindrical mirror 48K to the photosensitive drum 18K so as to be scanned over a peripheral (circumferential) plane of the photosensitive drum 18K. Also, the laser beam Y is entered into a cylindrical mirror 48Y arranged at a position corresponding to an upper position of the photosensitive drum 18Y by way of the plane mirror 46Y, and is projected from the cylindrical mirror 48Y to the photosensitive drum 18Y so as to be scanned over a peripheral (circumferential) plane of the photosensitive drum 18Y.

Figure 3:
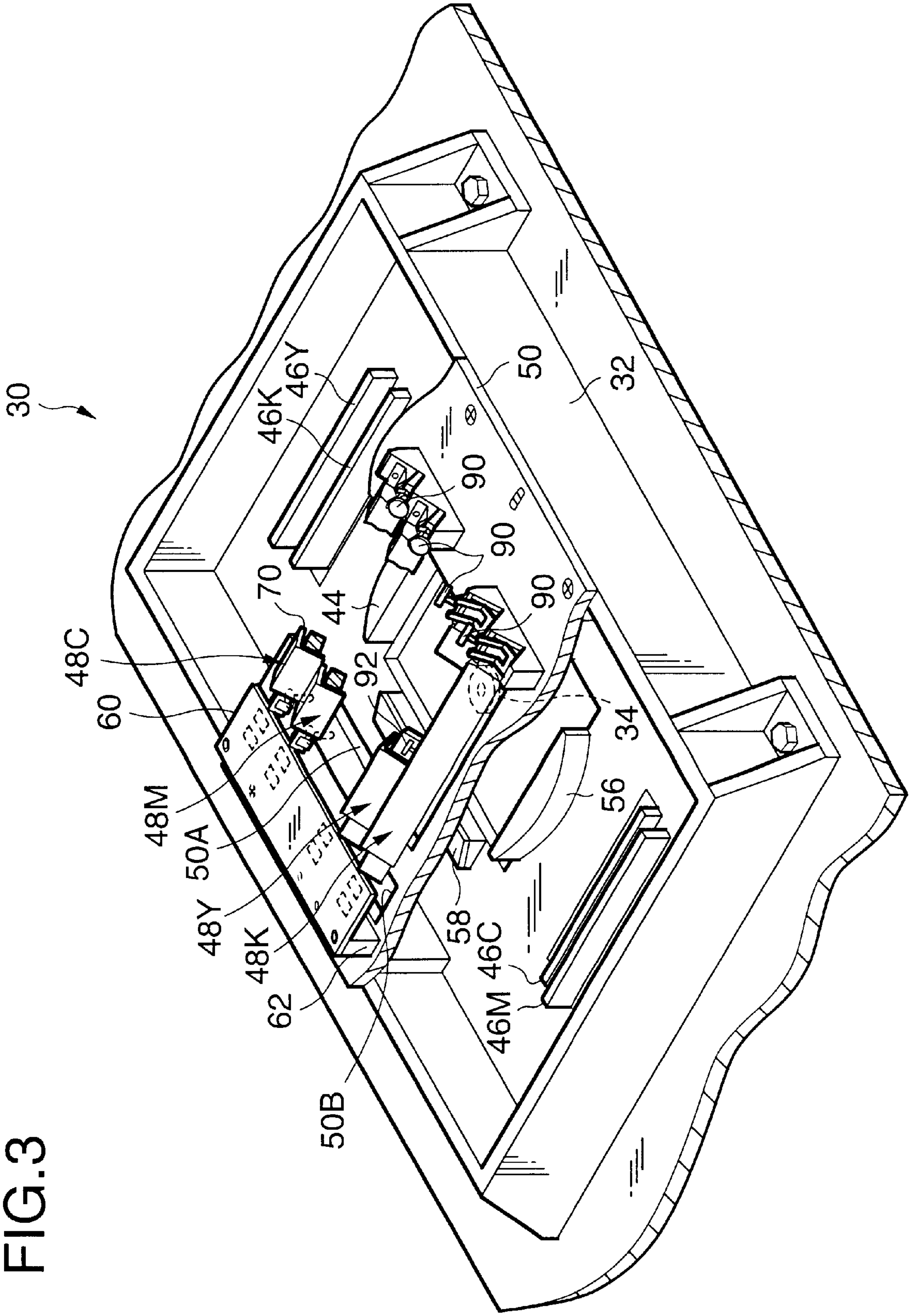
FIG. 3 is a perspective view of the plural beam scanning apparatus with partially fragmentating a lid of a casing.

It should also be noted that as shown in FIG. 3, the entire upper portion of the casing 32 is shielded by a lid 50. A rectangular-shaped opening 50A through which a laser beam will pass is formed at a substantially central portion of the lid 50. The cylindrical mirrors 48K and 48Y are arranged over the upper surface of the lid 50 in such a manner that these cylindrical mirrors 48K and 48Y bridge this opening 50A.

On the other hand, an LD (semiconductor laser) 36M for projecting laser light irradiated to the photosensitive drum 18M and another LD 36C for projecting laser light irradiated to the photosensitive drum 18C are arranged in the vicinity of a corner portion at an edge portion within the casing 32. These LD 36M and LD 36C are arranged at positions opposite to the arranging positions of the LD 36K and the LD 36Y while sandwiching the rotary polygon mirror 34.

A collimator lens 38C and a plane mirror 52 are successively arranged on the projection side of the laser beam of the LD (semiconductor laser) 36C. The laser beam C projected from the LD 36C is collimated by the collimator lens 38C, and then the collimated laser beam is entered into the plane mirror 52. Also, a collimator lens 38M and a plane mirror 54 are successively arranged on the projection side of the laser beam of the LD (semiconductor laser) 36M. The laser beam M projected from the LD 36M is collimated by the collimator lens 38M, and then the collimated laser beam is entered into the plane mirror 54, after being reflected on the plane mirror 54.

A "fθ" lens 56 is arranged between the plane mirror 52 and the rotary polygon mirror 34. Both the laser beam C and the laser beam M, which are reflected from the plane mirror 52, pass through the fθ lens 56 and then are entered into the rotary polygon mirror 34. These laser beams C and M are reflected and deflected on this rotary polygon mirror 34, and thereafter, again pass through the fθ lens 56.

While the position of the LD 36C is different from the position of the LD 36M along the axial line direction (corresponding to sub-scanning direction) of the rotary polygon mirror 34, both the laser beam C and the laser beam M are entered into the rotary polygon mirror 34 at different incident angles along the sub-scanning direction. As a result, the laser beams C and M which have passed through the fθ lens 56 two times are entered into the separate plane mirrors 46C and 46M.

Then, the laser beam C is entered into a cylindrical mirror 48C arranged at a position corresponding to an upper position of the photosensitive drum 18K by way of the plane mirror 46C, and is projected from the cylindrical mirror 48C to the photosensitive drum 18C so as to be scanned over a peripheral (circumferential) plane of the photosensitive drum 18C. Also, the laser beam M is entered into a cylindrical mirror 48M arranged at a position corresponding to an upper position of the photosensitive drum 18M by way of the plane mirror 46M, and is projected from the cylindrical mirror 48M to the photosensitive drum 18M so as to be scanned over a peripheral (circumferential) plane of the photosensitive drum 18M.

Figure 2:
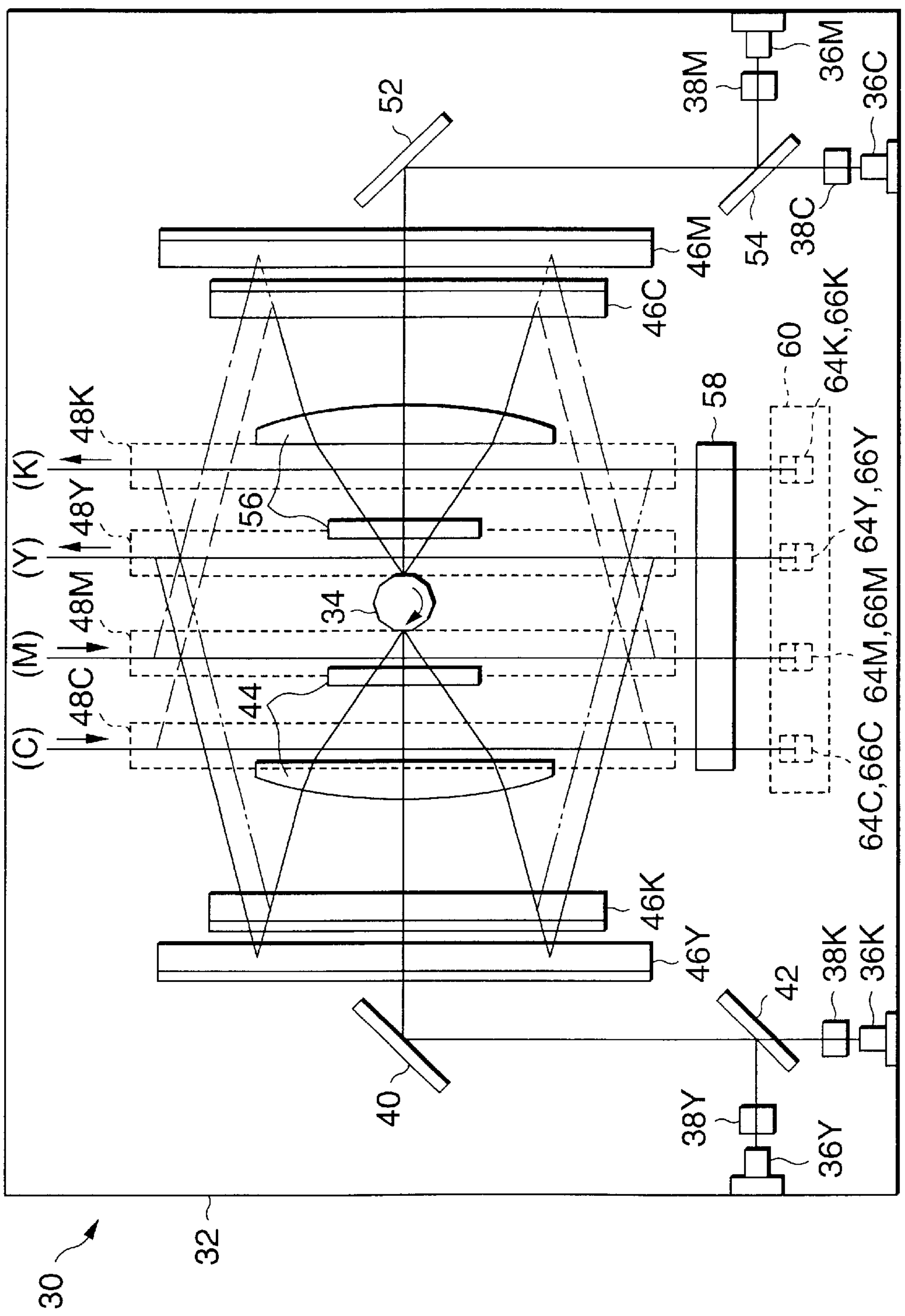
FIG. 2 is a plan view for schematically showing a plural beam scanning apparatus.

As apparent from the foregoing descriptions, since the laser beams K and Y, and the laser beams C and M are entered into the planes located opposite to the rotary polygon mirror 34, as indicated by arrow of FIG. 2, the laser beams K and Y are scanned along the scanning direction opposite to the laser beams C and M. It should also be noted that as shown in FIG. 3, the cylindrical mirrors 48C and 48M are arranged over the upper surface of the lid 50 in such a manner that these cylindrical mirrors 48C and 48M bridge this opening 50A formed in the lid 50 of the casing 32.

A pick up mirror (plane mirror) 58 is arranged in the vicinity of a bottom portion of the casing 32 in such a manner that the scanning trails of the laser beams K, Y, M, and C are intersected by this pick up mirror 58, and these laser beams K, Y, M, C has been reflected by the cylindrical mirrors 48K, 48Y, 48M, and 48C. The pick up mirror 58 is arranged in the vicinity of a start of scanning (SOS) edge portions of the laser beams K and Y. In other words, the pick up mirror 58 is arranged in the vicinity of end of scanning (EOS) edge portions of the laser beams K and Y.

As shown in FIG. 3, an opening 50B is formed in the lid 50 of the casing 32. This opening 50B is used to cause the respective laser beams entered into the pick up mirror 58 and reflected thereon to pass through this opening 50B. A sensor board 60 is arranged at such a position where the laser beams which have passed the opening 50B can be received.

The sensor board 60 is fixed on the upper surface of the lid 50 by way of a bracket 62.

Figure 4:
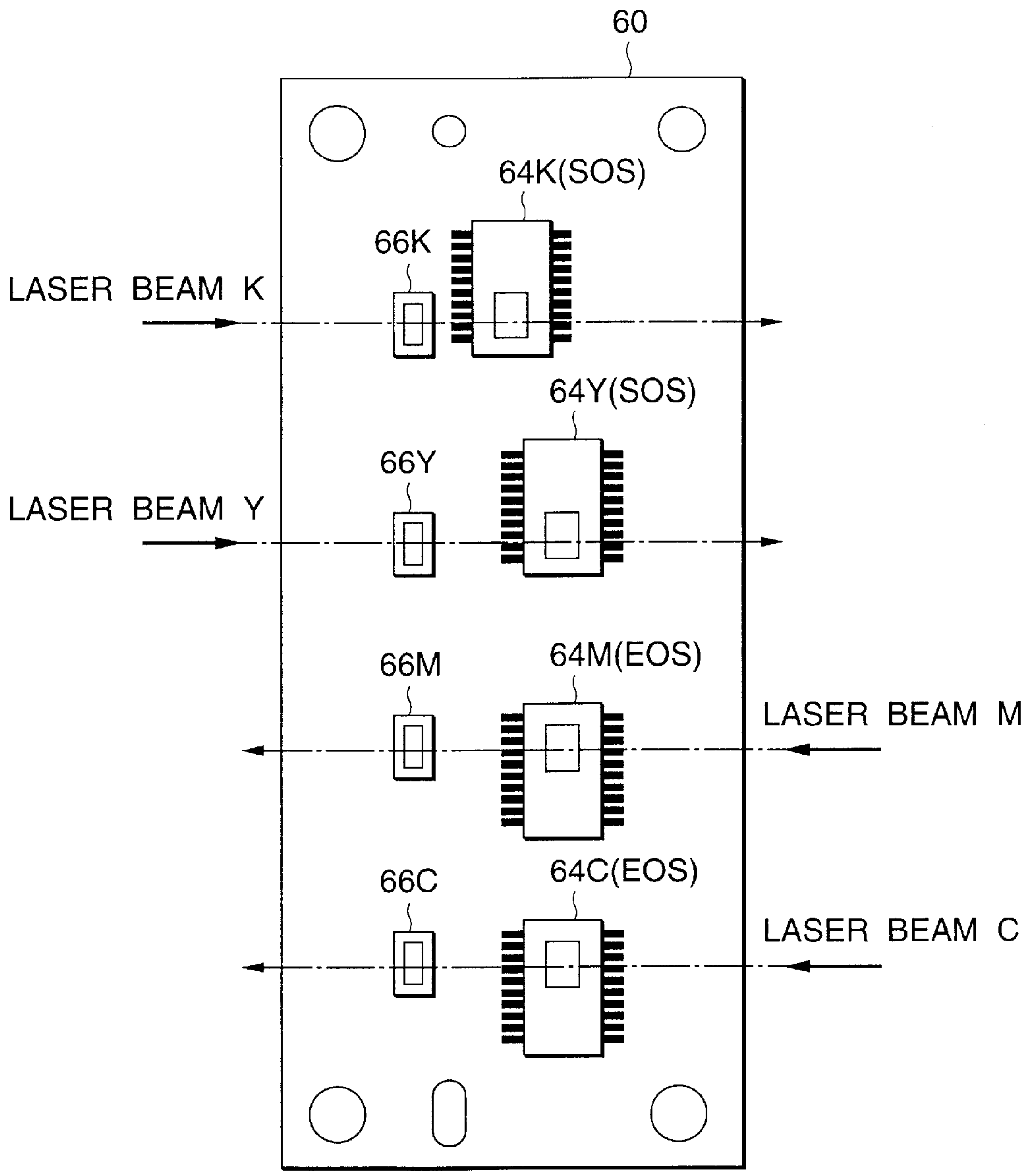
FIG. 4 is a plan view for schematically showing an arrangement of plural sensors on a sensor board.

As indicated by a dot/dash line in FIG. 4, the laser beams K, Y, M, and C are scanned while these laser beams K, Y, M, and C intersect over the sensor board 60. A main-scanning position detecting sensor 64 corresponding to a first beam detector of the present invention, and a sub-scanning position detecting sensor 66 corresponding to a second beam detector of the present invention are arrayed on the sensor board 60, respectively, along a scanning trail of each of the laser beams. The main-scanning position detecting sensor 64 is such an optical sensor which produces different-leveled output signal when a laser beam passes through a light receiving portion (namely, rectangular-shaped portion shown in FIG. 4) formed in a sensor chip, and also when a laser beam does not pass through this light receiving portion.

Figure 5A:
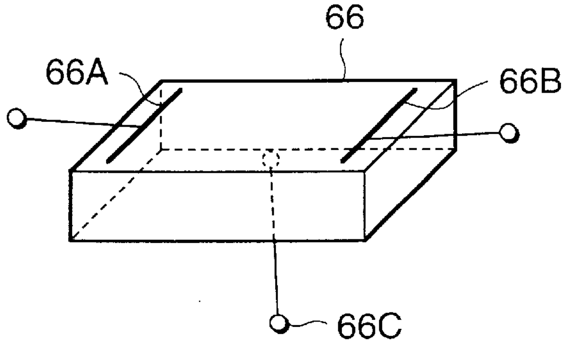
FIG. 5A is a perspective view for indicating an overall structure of a sub-canning position detecting sensor.
Figure 5B:
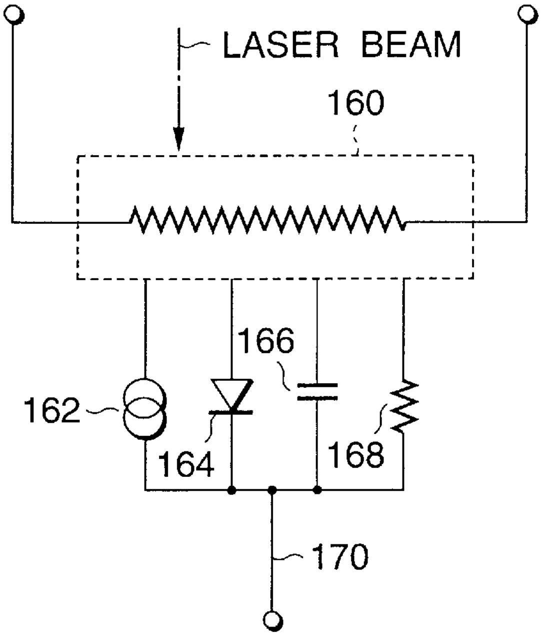
FIG. 5B is an equivalent circuit for the sub-scanning position detecting sensor.

As indicated in FIG. 5A, the sub-scanning position detecting sensor 66 (PSD) is arranged in such a manner that electrodes 66A and 66B are provided on both edge portions of a sensor element, and furthermore, a terminal 66C used to apply a bias voltage is connected. As indicated in FIG. 5B, an equivalent circuit is arranged that a current source 162, a diode 164, a junction capacitance 166, and a resistor 168 are connected in parallel to a positioning resistor 160. An incident position of a light beam can be detected by the positioning resistor 160 (reference numeral 170 indicates bias voltage). It should be understood that the below-mentioned sense signal discriminations are made in this specification. That is to say, a sense signal outputted from the main-scanning position detecting sensor 64K in correspondence with the laser beam K will be referred to as "SOS (K)", and a sense signal outputted from the main-scanning position detecting sensor 64Y in correspondence with the laser beam Y will be referred to as "SOS (Y)", and a sense signal outputted from the main-scanning position detecting sensor 64M in correspondence with the laser beam M will be referred to as "EOS (M)", and also a sense signal outputted from the main-scanning position detecting sensor 64C in correspondence with the laser beam C will be referred to as "EOS (C)".

Furthermore, the sub-scanning position detecting sensor 66 detects a passing-through position of a laser beam along a sub-scanning direction located perpendicular to the scanning direction of the laser beam, and then outputs a sensor signal having a level corresponding to the detected passing-through position. This sub-scanning direction corresponds to the longitudinal direction of the sensor board 60 shown in FIG. 4. It should be understood that the below-mentioned sense signal discriminations are made in this specification. That is to say, a sense signal outputted from the sub-scanning position detecting sensor 66K in correspondence with the laser beam K will be referred to as "PSD (K)", and a sense signal outputted from the sub-scanning position detecting sensor 66Y in correspondence with the laser beam Y will be referred to as "PSD (Y)", and a sense signal outputted from the sub-scanning position detecting sensor 66M in correspondence with the laser beam M will be referred to as "PSD (M)", and also a sense signal outputted from the sub-scanning position detecting sensor 66C in correspondence with the laser beam C will be referred to as "PSD (C)".

It should also be noted that both the pick up mirror 58 and the sensor board 60 are formed in the integral forms with the respective colors K, Y, M, and C, but the present invention is not limited thereto. Alternatively, the pick up mirror 58 and the sensor board 60 may be separately provided with respect to each of these four colors.

CORRECTING MECHANISM OF INCLINATION/ CURVE OF SCANNING TRAIL

Next, a description will now be made of a mechanism capable of correcting an inclination and a curve of a scanning trail of a laser beam. It should be noted that the above-described correcting mechanism is separately added to each of cylindrical mirrors 48K, 48Y, 48M, and 48C in correspondence with each of laser beams, and these cylindrical mirrors 48K, 48Y, 48M, 48C will be totally referred to as a "cylindrical mirror 48 " in the below-mentioned specification.

Figure 6:
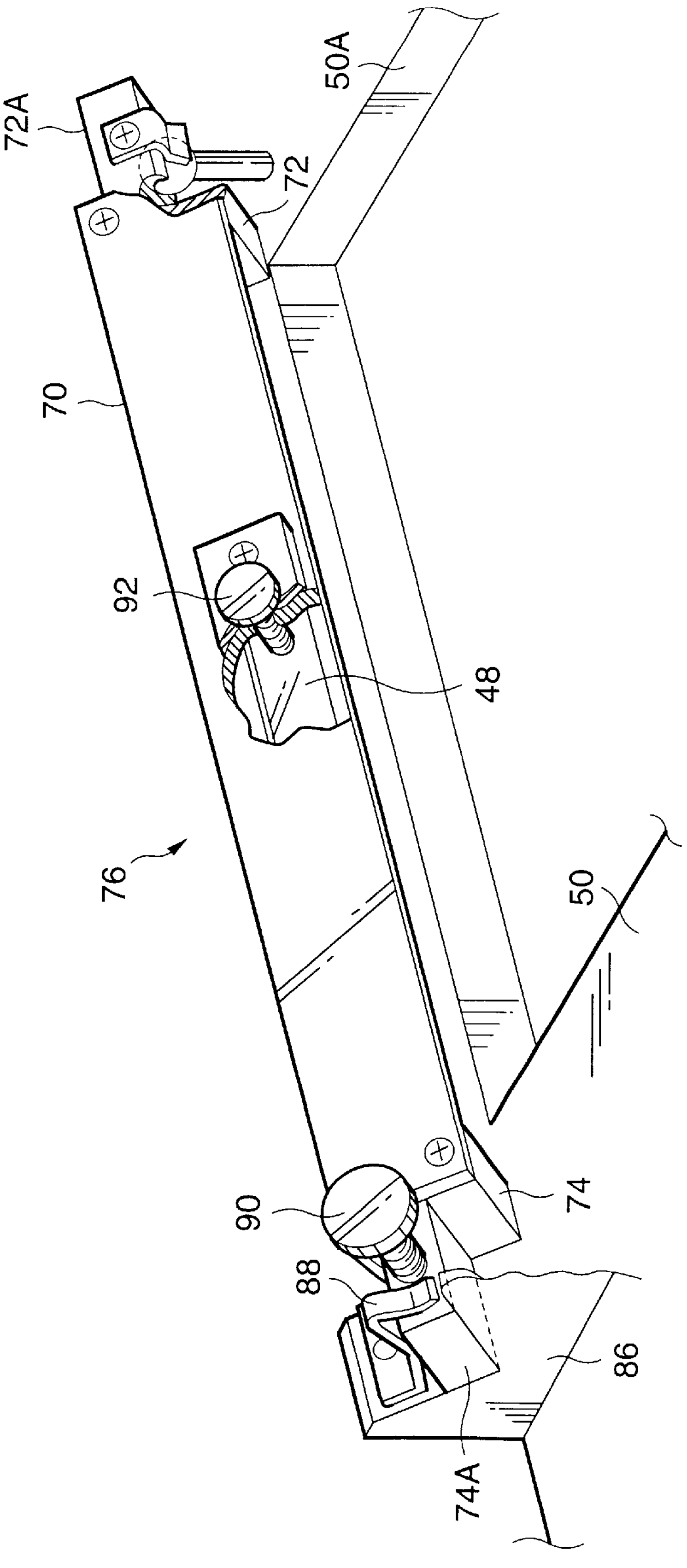
FIG. 6 is a perspective view for indicating a holder used to hold a cylindrical mirror.

As indicated in FIG. 6, the cylindrical mirror 48 is held by a holder 76. Precisely speaking, both end portions of this cylindrical mirror 48 along the longitudinal direction are held by this holder 76. This holder 76 is constituted by a long-scale-shaped frame 70 with L shaped cross-section (see FIG. 3), and blocks 72 and 74. These blocks 72 and 74 are mounted by screws of both ends of this frame 70. The projection portions 72A and 74A are formed on the blocks along the longitudinal direction of the cylindrical mirror 48.

Figure 7:
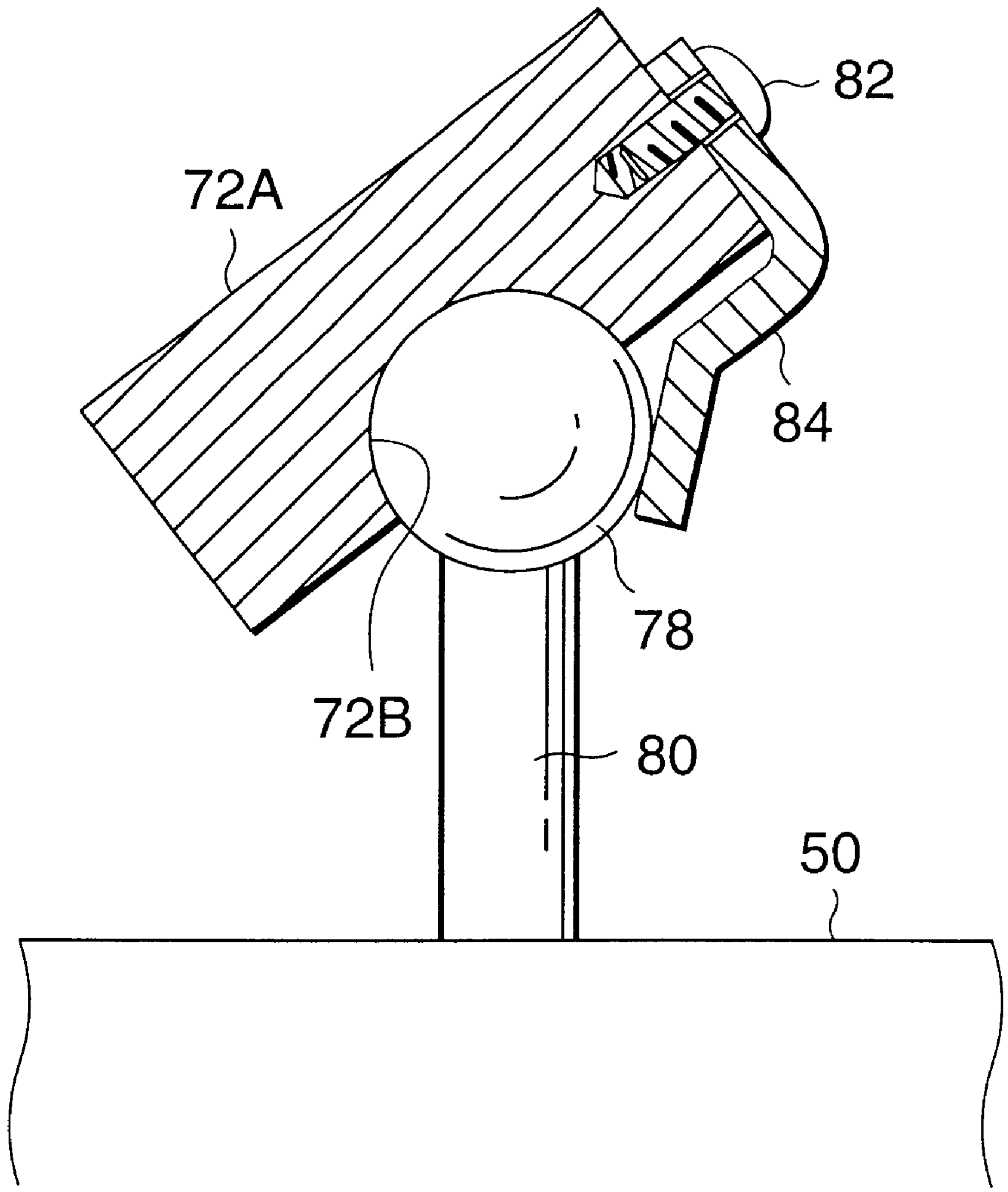
FIG. 7 is a sectional view for showing a supporting structure of one edge portion of the holder.

As shown in FIG. 7, an arc-shaped notch 72B is formed at the projection portion 72A of the block 72, and a shaft 80 is provided at a position of the upper surface of the lid 50, corresponding to the notch 72B of the block 72. A bearing 78 is mounted at a tip portion of this shaft 30. This bearing 78 is arranged in such a manner that this bearing 78 is made in contact with an inner surface of the notch 72B, and is sandwiched between a leaf spring 84 and the block 72. The leaf spring 84 is fixed to the block 72 by using a screw 82. As a result, the holder 76 is pivotally journaled around the bearing 78 as a pivot center.

On the other hand, a supporting member 86 is fixed at a position of the upper surface of the lid 50, corresponding to the block 74. A V-shaped groove is formed in this supporting member 86 so as to hold the projection portion 74A of the block 74. The projection portion 74A of the block 74 is arranged within the above-explained V-shaped groove, and is depressed in a direction along which this projection portion 74A is approached to the bottom surface of the V-shaped groove, by receiving energizing force of another leaf spring 88. This leaf spring 88 is mounted on the supporting member 86 by using a rivet. Also, a through hole is formed in the projection portion 74A of the block 74, a female screw is formed in this through hole, and an adjusting screw 90 is meshed with this female screw.

In this case, under such a condition that this adjusting screw 90 is screwed until a tip portion of the adjusting screw 90 is slightly projected from the projection portion 74A, the projection amount of the tip portion of the adjusting screw 90 from the projection portion 74A is varied in proportion to the rotation amount of the adjusting screw 90. In response to this variation of the projection amount, the projection portion 74A of the block 74 is deviated along a direction corresponding to the variation direction of the projection amount against the energizing force of the leaf spring 88. Both the holder 76 and the cylindrical mirror 48 are pivoted around the bearing 78 as a pivot center in connection with this deviation. As a result, the inclination of the scanning trail of the laser beam on the photosensitive drum 18 is varied. The laser beam is reflected by the cylindrical mirror 48.

Figure 8A:
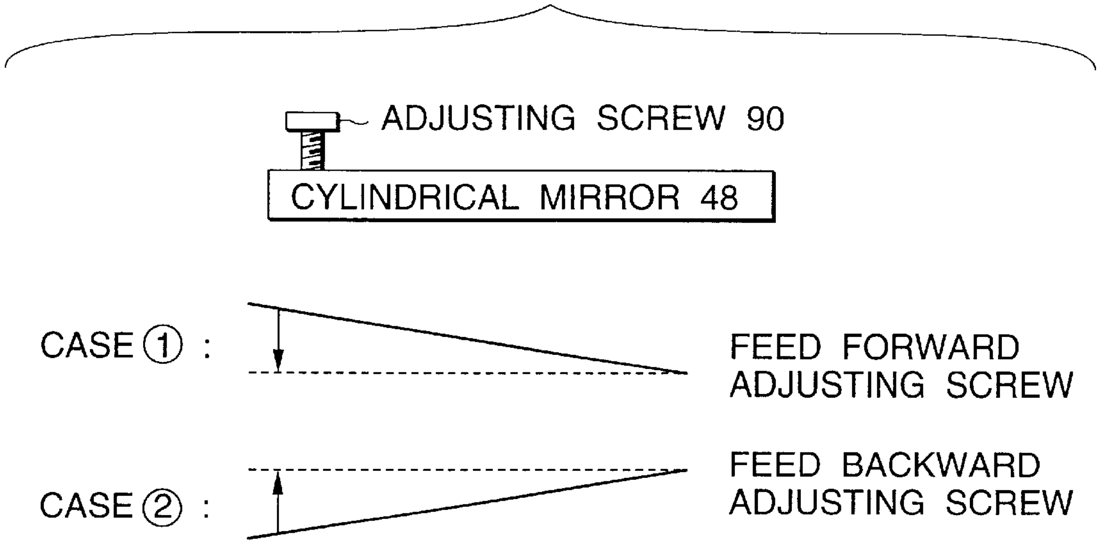
FIG. 8A is an explanatory diagram for explaining how to correct an inclination of a scanning trail of a laser beam by deviating an edge portion of the cylindrical mirror.

Both the changing direction and the changing amount of the inclination of the scanning trail occurred when the adjusting screw 90 is rotated may correspond to the changing direction and the changing amount of the projection amount of the tip portion of the adjusting screw 90. As a consequence, for instance, as to any of cases indicated in FIG. 8A, the inclination of the scanning trail of the laser beam can be corrected by selecting the changing direction of the projection amount of this adjusting screw 90 (namely, rotating direction of adjusting screw 90).

Also, another through hole is formed in a center portion of the frame 70 along the longitudinal direction of this frame 70, a female screw is formed in this through hole, and an adjusting screw 92 is meshed with this female screw. This adjusting screw 92 is screwed until a tip portion of the adjusting screw 92 passes through the frame 70 and then is made in contact with a side surface (non-reflection surface) of the cylindrical mirror 48. In this case, when the adjusting screw 92 is rotated, a magnitude of force by which the tip portion of the adjusting screw 92 depresses the side surface of the cylindrical mirror 48 is varied in response to both the rotation direction and the rotation amount of the adjusting screw 92. In response to this variation of the depression force, the flexing amount of the cylindrical mirror 48 is also varied.

Figure 8B:
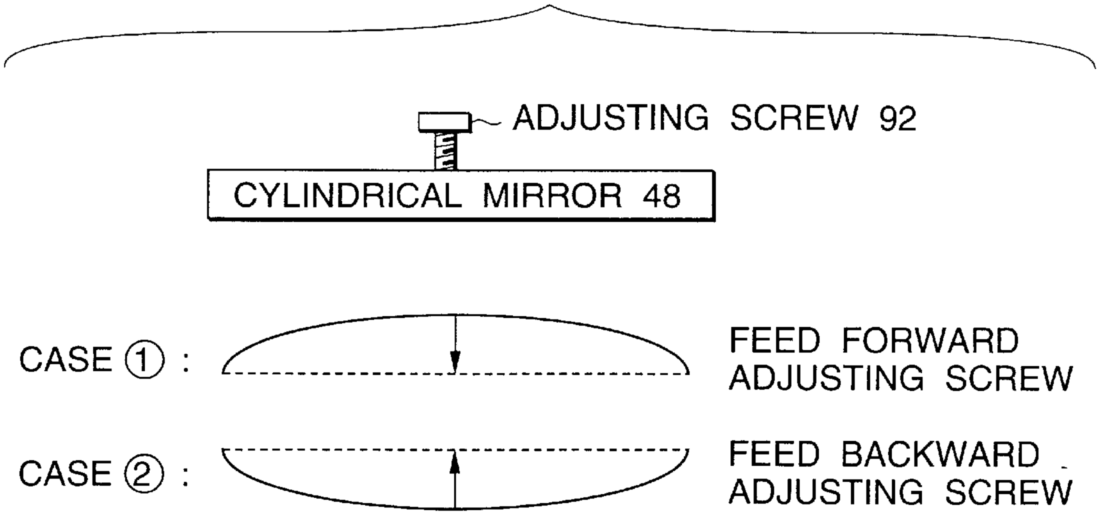
FIG. 8B is an explanatory diagram for explaining how to correct a curve of a scanning trail of a laser beam by flexing the cylindrical mirror.

Since the laser beam reflected by the cylindrical mirror 48 is scanned in such a way that this reflected laser beam will trace a generating line of the cylindrical mirror 48, a curve degree of a scanning trail on the photosensitive drum 18 is changed by changing the above-explained depression force. Both the changing direction and the changing amount of the curve of the scanning trail occurred when the adjusting screw 92 is rotated may correspond to both the changing direction and the changing amount of the flexing amount of the cylindrical mirror 48, namely both the changing direction and the changing amount of the tip position of the adjusting screw 92. As a consequence, for example, as to any of cases indicated in FIG. 8B, the curve of the scanning trail of the laser beam can be corrected by selecting the changing direction of the tip position of the adjusting screw 92 (rotation direction of adjusting screw 92).

CONTROL SYSTEM OF PLURAL BEAM SCANNING APPARATUS

Figure 9:
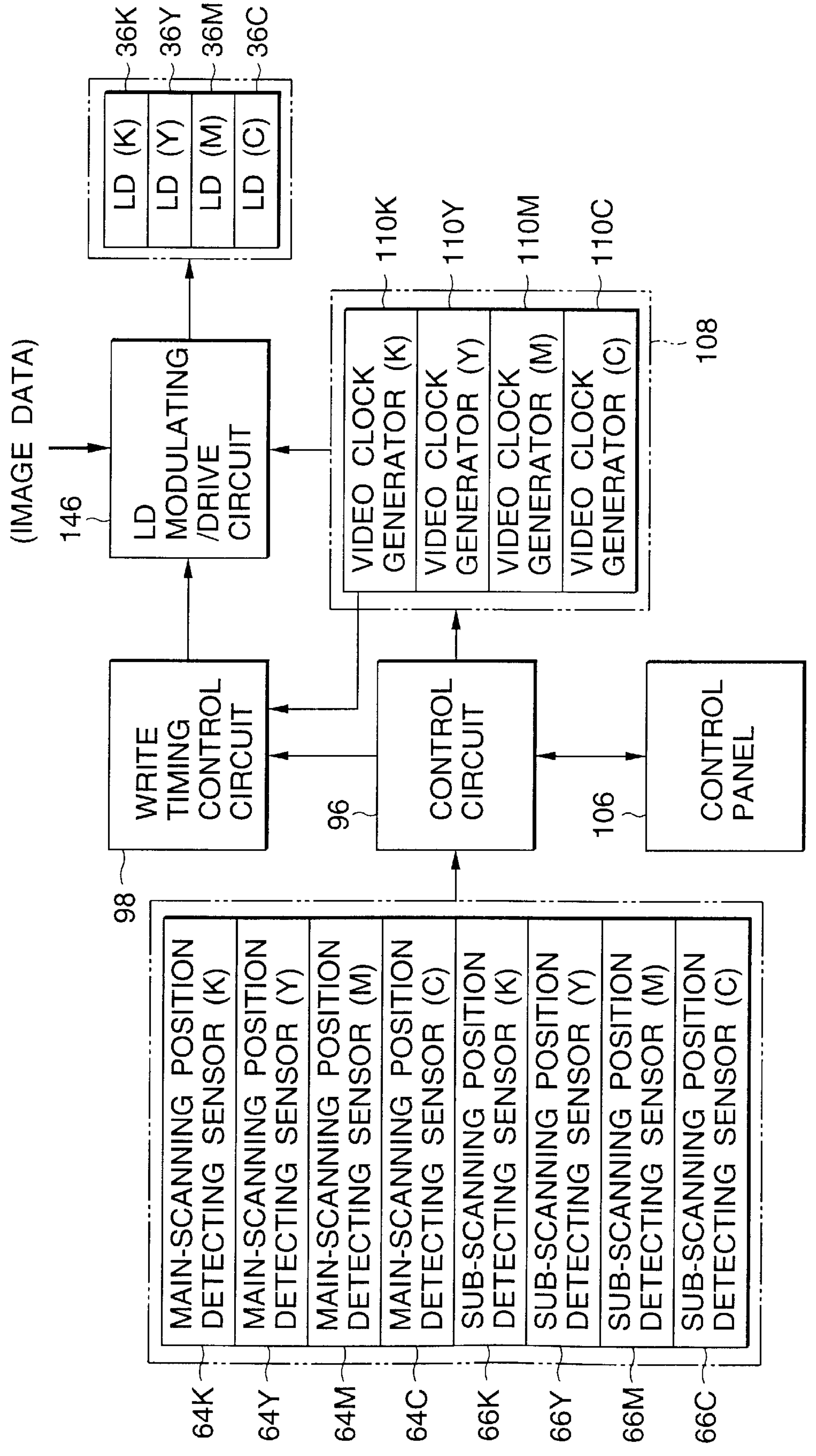
FIG. 9 is a schematic block diagram for indicating an arrangement of a control system used to control operations of the plural beam scanning apparatus.
Figure 10:
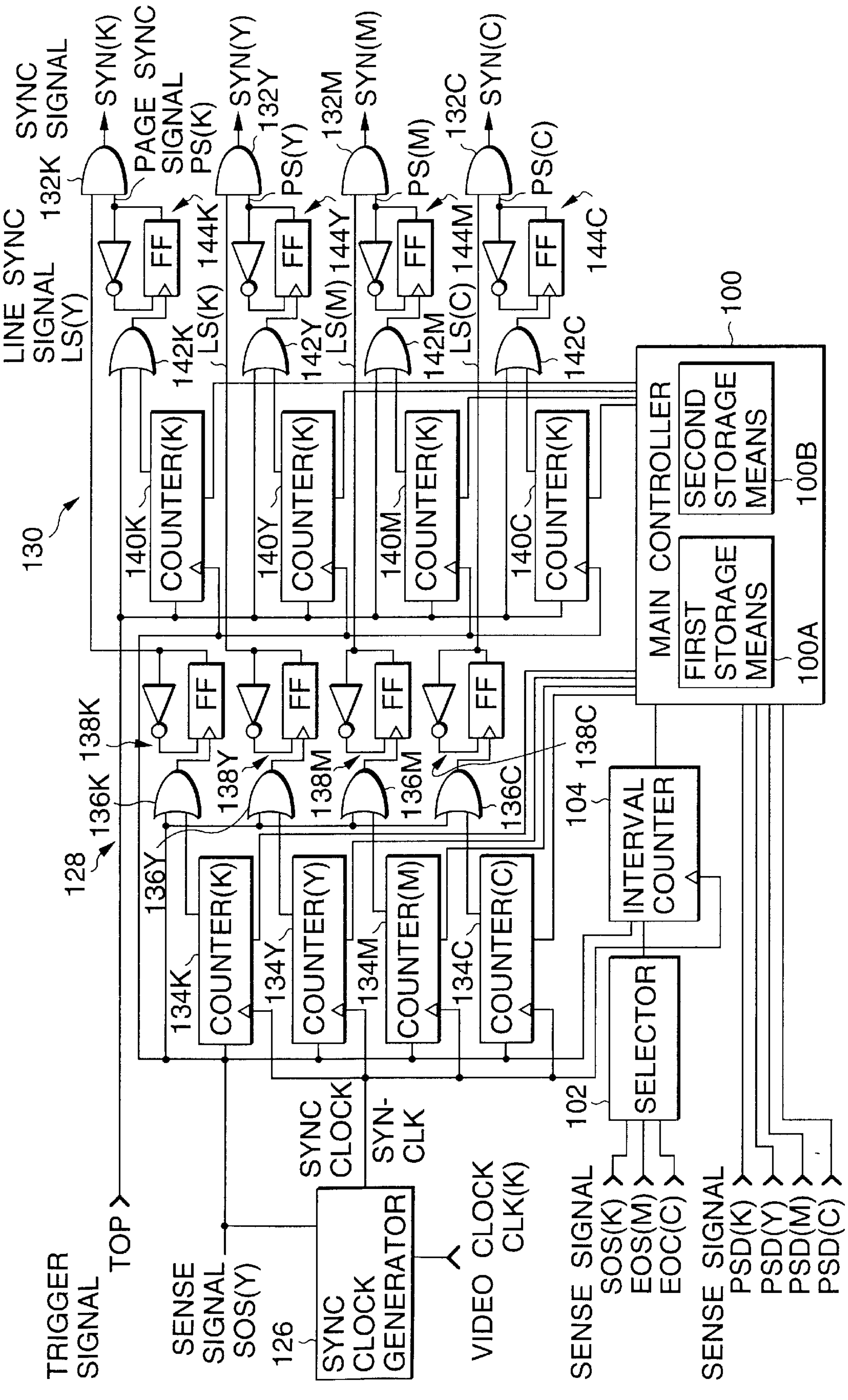
FIG. 10 is a schematic block diagram for indicating an arrangement of a write timing control circuit.

Referring now to FIG. 9 and FIG. 10, a description will be made of an arrangement of a control system for controlling operations of the plural beam scanning apparatus 30 including circuits for controlling drive operations of the semiconductor lasers LD 36K, LD 36Y, LD 36M, and LD 36C. Both the main-scanning position detecting sensor 64 and the sub-scanning position detecting sensor 66 are connected to a control circuit 96, respectively, and a write timing control circuit 98 is connected to this control circuit 96. It should be noted that both the control circuit 96 and the write timing control circuit 98 correspond to a modulation controller of the present invention.

As represented in FIG. 10, the control circuit 96 is arranged by employing a main controller 100 constructed of a microprocessor and the like, a selector 102, and a peripheral circuit such as an interval counter 104 (other circuits are omitted). Also, a control panel 106 is connected to this control circuit 96 (see FIG. 9). The control panel 106 is constituted by employing display such as a liquid crystal display (LCD), and information input apparatus such as a ten key and a touch panel.

Also, a video clock generating apparatus 108B is connected to the control circuit 96. The video clock generating apparatus 108 is arranged in such a manner that a video clock generator 110 for generating a video clock signal is provided with respect to each of colors K, Y, M, C, and the video clock signal is used to define modulation timing for a laser beam every 1 dot.

Figure 11A:
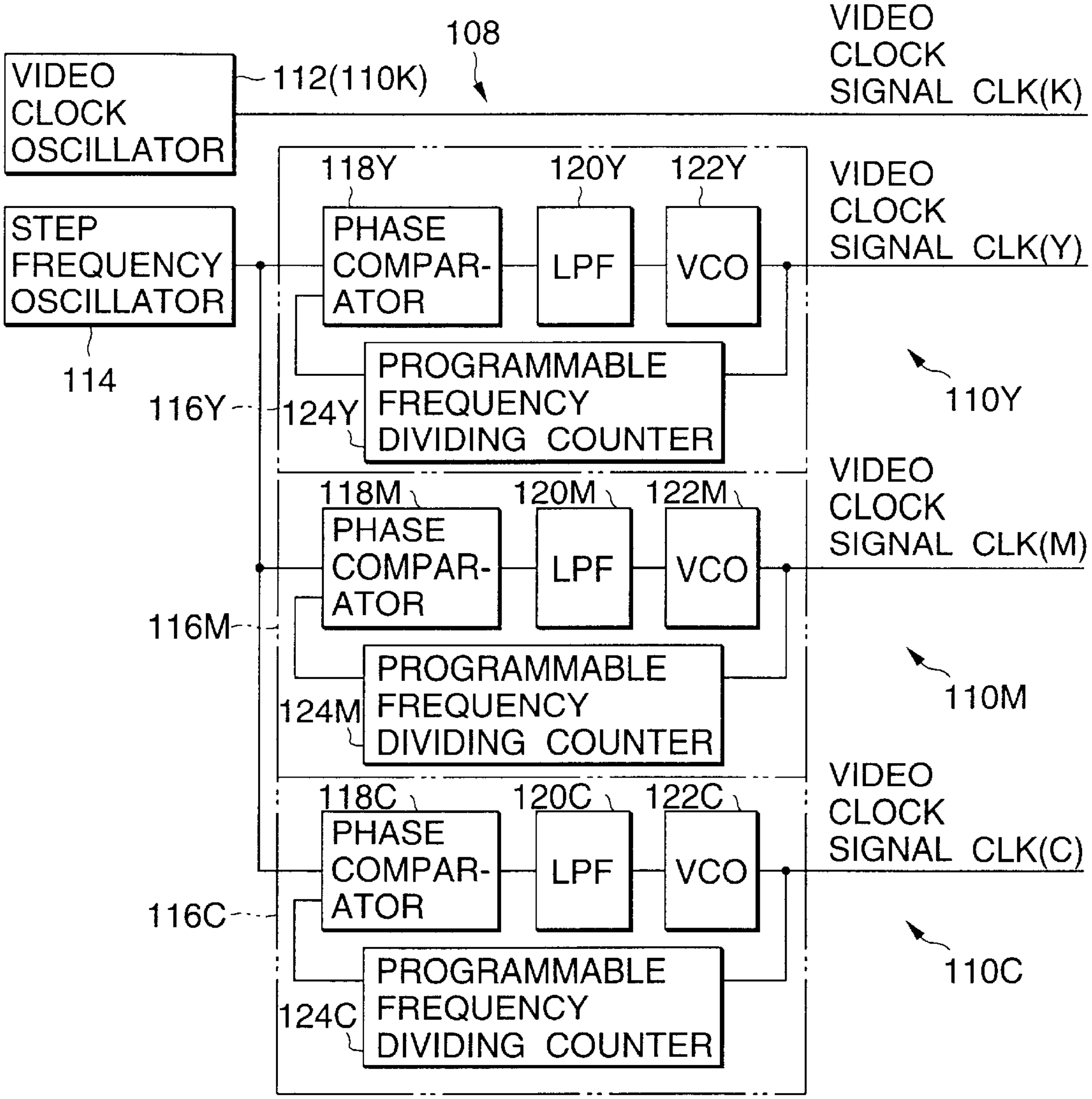
FIG. 11A is schematic block diagram for indicating an arrangement of a video clock generator.

As shown in FIG. 11A, a video clock generator 110K for generating a video clock signal CLK(K) for the color K is constructed of a video clock oscillator 112 for oscillating an oscillation signal having a constant frequency. On the other hand, video clock oscillators 110Y, 110M, and 110C for producing video clock signal CLK(Y), CLK(M), and CLK (C) for the colors Y, M, C are arranged by employing a single step frequency oscillator 114, and a frequency dividing synthesizer 116 which is provided with the respective colors Y, M, C.

The frequency dividing synthesizer 116 is arranged by that a phase comparator 118, a low-pass filter (LPF) 120, and a voltage-controlled oscillator (VCO) 122 are series-connected to the output terminal of the step frequency oscillator 114. Furthermore, an output (video clock signal) from the VCO 122 is inputted via a programmable frequency dividing counter 124 to the phase comparator 118. The frequency of the video clock signal outputted from the frequency dividing synthesizer 116 is varied based upon a set value entered from the control circuit 96 to the programmable frequency dividing counter 124.

In other words, when the set value is made small, the oscillation frequency of the VCO 122 (namely, frequency of video clock signal) may be balanced under such a condition that this oscillation frequency becomes lower than the oscillation frequency obtained before this set value is varied. To the contrary, when the set value is increased, the frequency of the video clock signal may be balanced under such a condition that this frequency becomes higher than the frequency obtained before this set value is varied. Since the video clock signal is such a signal for defining the modulation timing every 1 dot, the frequency of the video clock signal is changed, so that the dot interval along the main scanning direction is varied and also magnification (recording range length by laser beam along main scanning direction) is varied.

Figure 11B:
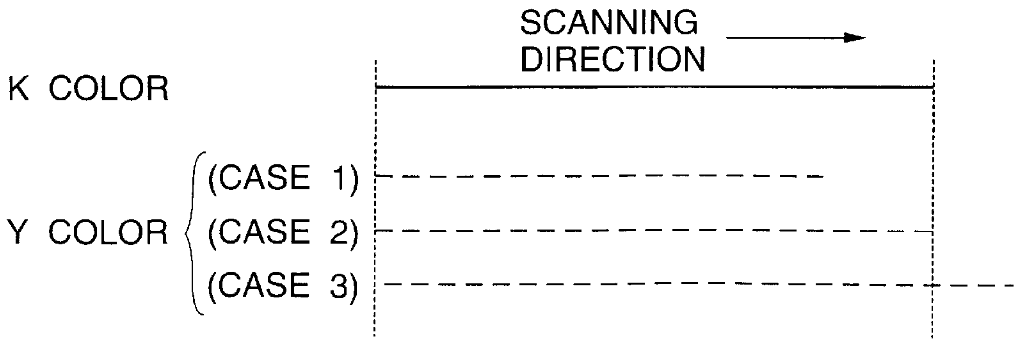
FIG. 11B is a conceptional view for explaining how to correct a frequency of a video clock signal.

As a consequence, for example, as shown as a case 1 in FIG. 11B, in the case that the recording length made by the laser beam Y along the main scanning direction is shorter than the recording range length by the laser beam K along the main scanning direction (namely, magnification is small), if a value of data (will be referred to as magnification setting data VDATA) set to the programmable frequency dividing counter 124 is made small, as shown as a case 2, then the recording lengths (magnification) can be made equal to each other. Also, for example, as shown as a case 3 in FIG. 11B, in the case that the recording length made by the laser beam Y along the main scanning direction is longer than the recording range length by the laser beam K along the main scanning direction (namely, magnification is large), if a value of magnification setting data VDATA set to the programmable frequency dividing counter 124 is made large, then the recording lengths (magnification) can be made equal to each other.

Figure 12A:
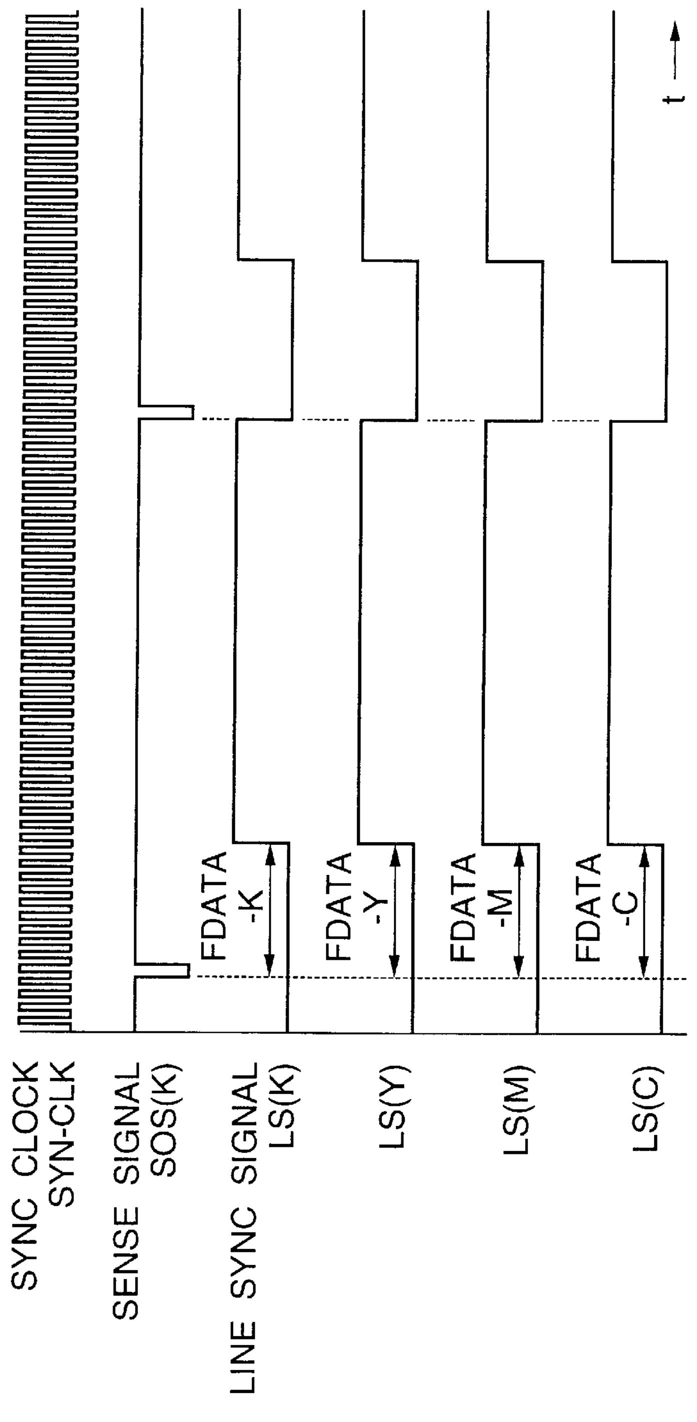
FIG. 12A and FIG. 12B are timing charts for showing a line synchronization signal and a signal related to the production of this line synchronization signal.
Figure 12B:
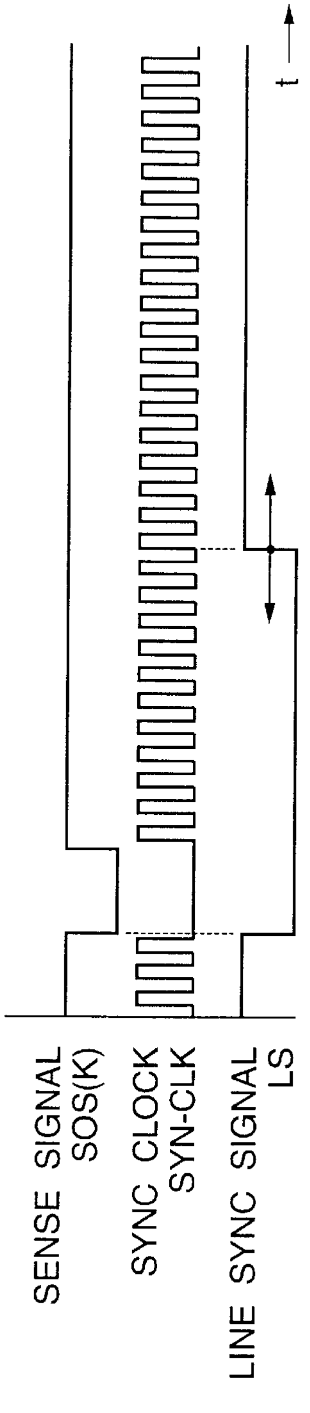

The write timing control circuit 98 is constituted by a sync (synchronization) clock generator 126, a line starting control circuit 128, a page starting control circuit 130, and 4 sets of AND gate circuits 132. The video clock signal CLK(K) having a constant frequency is entered from the video clock generator 110K into the sync clock generator 126, and furthermore, the sense signal SOS(K) is entered from the main-scanning position detecting sensor 64K into this sync clock generator 126. Then, this sync clock generator 126 generates and outputs a sync clock signal SYN-CLK (see FIG. 12B) in response to the entered signals.

The line starting control circuit 128 is arranged by that 4 sets of circuit groups are employed with respect to the four colors K, Y, M, C. This circuit group is equipped with a counter circuit 134, an OR gate circuit 136, and a flip-flop circuit 138. With respect to each of the four laser beams projected from the LDs 36, this line starting control circuit 128 produces a line sync signal LS for the four colors K, Y, M, C based upon the sense signal SOS (K), the sync clock signal SYN-CLK, and line sink setting data saved in the main controller 100. This line sync signal LS indicates timing at which a modulation of a laser beam is commenced during a single scanning operation.

In other words, when the entered sense signal SOS(K) becomes a low level, the counter circuit 134 acquires the line sink setting data (corresponding to first setting value as recited in Claim 2) from the main controller 100 as a count value, and then decrements the count value at such timing in synchronism with the sync clock SYN-CLK. Then, when the count value becomes 0, this counter circuit 134 outputs a pulse signal. This pulse signal is inputted via the OR gate circuit 136 to the flip-flop circuit 138. A level of an output signal (line sync signal LS) derived from the flip-flop circuit 138 is switched, while using this pulse signal as a trigger signal (see FIG. 12A). As previously explained, the timing at which the level of the line sync signal LS is switched is varied as indicated by an arrow of FIG. 12B in response to the value of the line sink setting data (expressed as "FDATA" in FIG. 12A) acquired by the counter circuit 134. This level switching timing corresponds to such timing when the modulation of the laser beam is commenced during a single main scanning operation. Then, a side registration position is also changed in response to a change in this timing. In the above embodiment, while setting such timing at which the laser beam K is sensed by the main-scanning position detecting sensor 64K as the reference, the modulation starting timing of the respective laser beams within one scanning period is controlled based on the line sink setting data, which corresponds to a modulation controller as recited in one embodiment. The first-mentioned timing corresponds to such timing when the sense signal SOS(K) becomes the low level.

Similar to the line starting control circuit 128, the page starting control circuit 130 is arranged by employing 4 sets of circuit groups in correspondence with the four colors K, Y, M, C. This circuit group is equipped with a counter circuit 140, an OR gate circuit 142 and a flip-flop circuit 144. A trigger signal TOP is entered into this page starting control circuit 130. This trigger signal TOP is used to determine such timing when the transport of the transfer member 28 to the transfer belt 14 is commenced. With respect to each of the four laser beams projected from the LDs 36, this page starting control circuit 130 produces a page sync signal PS as to the four colors K, Y, M, C based upon the sense signal SOS(K), the trigger signal TOP, and page sink setting data saved in the main controller 100. This page sync signal PS indicates timing at which a modulation of a laser beam is commenced during a scanning operation for one page.

Figure 13A:
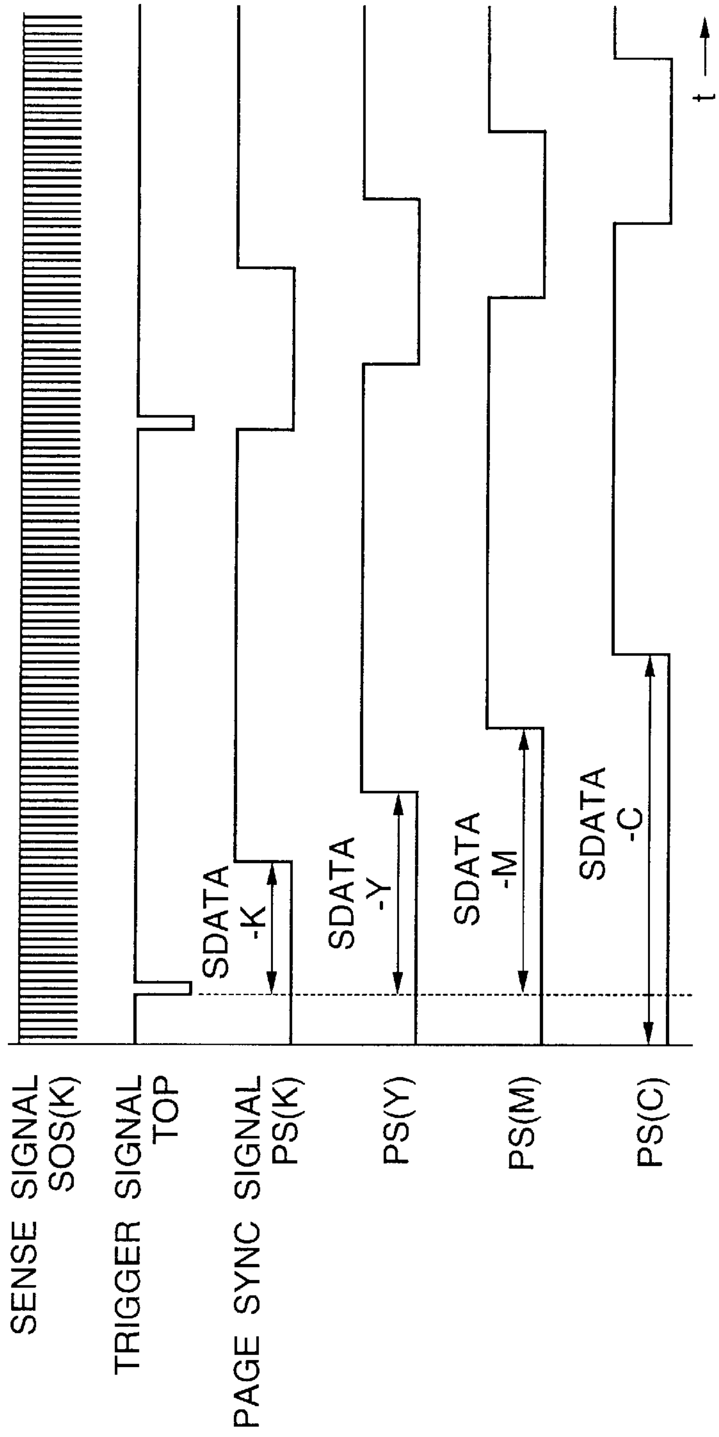
FIG. 13A and FIG. 13B are timing charts for showing a page synchronization signal and a signal related to the production of this page synchronization signal.

In other words, when the entered trigger signal TOP becomes a low level, the counter circuit 140 acquires the page sink setting data from the main controller 100 as a count value, and then decrements the count value at such timing in synchronism with the sense signal SOS(K). Then, when the count value becomes 0, this counter circuit 140 outputs a pulse signal. This pulse signal is inputted via the OR gate circuit 142 to the flip-flop circuit 144. A level of an output signal (page sync signal PS) derived from the flip-flop circuit 144 is switched, while using this pulse signal as a trigger signal (see FIG. 13A).

Figure 13B:
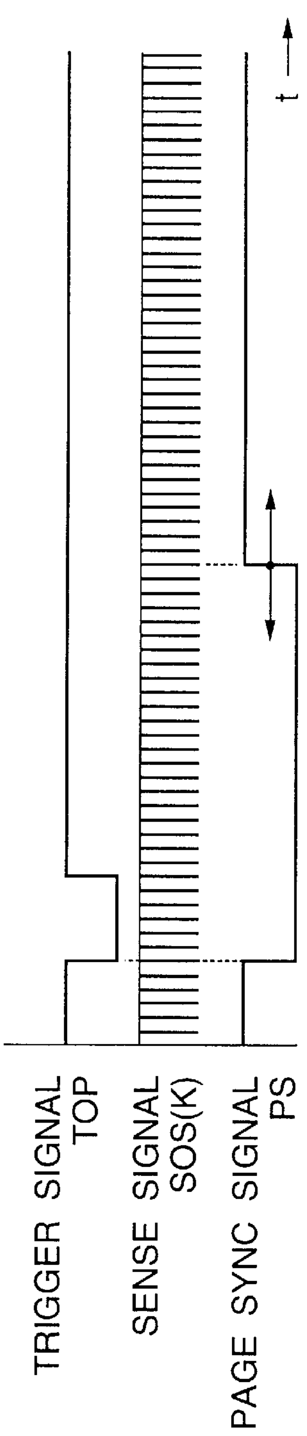

As previously explained, the timing at which the level of the page sync signal LS is switched is varied in unit of 1 line as indicated by an arrow of FIG. 13B in response to the value of the page sink setting data (expressed as "SDATA" in FIG. 13A) acquired by the counter circuit 140. This level switching timing corresponds to such timing when the modulation of the laser beam is commenced during a scanning operation for one page. Then, a lead registration position is also changed in response to a change in this timing. In the above embodiment, the modulation starting timing of each of the laser beams is controlled based upon the page sink setting data while using one scanning operation as one unit, which corresponds to a portion of the modulation controller as recited in another embodiment.

The AND gate circuit 132 is connected at both the line starting control circuit 128 and the page starting control circuit 130. The AND circuit 132 outputs the sync signal SYN as to the four colors K, Y, M, C. This sync signal SYN corresponds to an AND-gated result between the line sync signal LS and the page sync signal PS.

An LD modulating/drive circuit 146 is connected to the write timing control circuit 98. A sync signal SYN(K), another sync signal SYN(Y), another sync signal SYN(M), and a further sync signal SYN(C), which correspond to the respective colors, are supplied to this LD modulating/drive circuit 146. Also, the LD modulating/drive circuit 146 is connected to the video clock generating apparatus 108. A video clock signal CLK(K), another video clock signal CLK(Y), another video clock signal CLK(M), and a further video clock signal CLK(C), which correspond to the respective colors, are entered to the video clock generating apparatus 108. Furthermore, color image data is inputted to the LD modulating/drive circuit 146. This color image data resolves a color image which should be formed on the transfer member 28 into 4 colors K, Y, M, C and then expresses these four colors.

Within a time period defined by the sync signal SYN corresponding to the same color, the LD modulating/drive circuit 146 controls the drive operation of the respective LDs 36 in such a manner that the laser beams modulated in response to the image data corresponding to the same color are projected from the respective semiconductor lasers LD36K, LD36Y, LD36M, and LD36C at timing in synchronism with the video clock signal CLK corresponding to the same color. As a result, the laser beams are projected from the respective LDs 36, and then the projected laser beams are deflected in connection with the rotations of the rotary polygon mirror 34, so that these laser beams are scanned over the photosensitive drums 18K, 18Y, 18M, 18C.

COLOR SHIFT CORRECTION BY IMAGE FORMING APPARATUS

As the effects of this embodiment mode, color shift (deviation) correcting operation/process for a color image formed by the image forming apparatus 10 will now be successively explained.

A first color shift correction is carried out when the plural beam scanning apparatus 30 is manufactured/assembled (1) At this correction time, the lead registration is corrected (1-1), the inclination of scanning line is corrected (1-2), and the curve of scanning line is corrected (1-3). The lead registration correction (1-1) is an adjusting work which must be generally carried out when an optical system is assembled. That is to say, the positions and the attitudes of the optical components such as the reflection mirrors which constitute the optical system of the plural beam scanning apparatus 30 are adjusted, and the optical alignment is fitted to the nominal condition. The lead registration correction (1-1) corresponds to a coarse adjustment of the lead registration in this embodiment. This lead registration correction (1-1) also contains another effect. That is, a shift contained in the lead registration can be restricted into a controllable range prior to a fine adjustment of the lead registration (will be discussed later).

The inclination of the scanning line (1-2) is corrected as follows. That is, while the inclination direction of the scanning trail and the inclination magnitude thereof are measured as to each of the four laser beams projected from the scanning apparatus 30 by using a checking/measuring apparatus (not shown in detail) of the scanning apparatus 30, the adjustment screw 90 is manipulated. The inclinations of the scanning trails of the laser beams are corrected by adjusting an angle of the holder 76 of the cylindrical mirror 48. It should also be noted that the inclination correction of the scanning line (1-2) corresponds to the coarse adjustment of the scanning line inclination in this embodiment.

The curve of the scanning line (1-3) is corrected as follows. That is, while the curve direction of the scanning trail and the curve magnitude thereof are measured as to each of the four laser beams projected from the scanning apparatus 30 by using a checking/measuring apparatus (not shown in detail) of the scanning apparatus 30, the adjustment screw 92 is manipulated. The inclination of the scanning trails of the laser beams are corrected by adjusting a flex amount of the cylindrical mirror 48. It should also be noted that the curve correction of the scanning line (1-3) corresponds to the fine adjustment of the scanning line curve in this embodiment. After the scanning apparatus 30 has been manufactured/assembled, the adjustment of the scanning line curve is not carried out.

Figure 14:
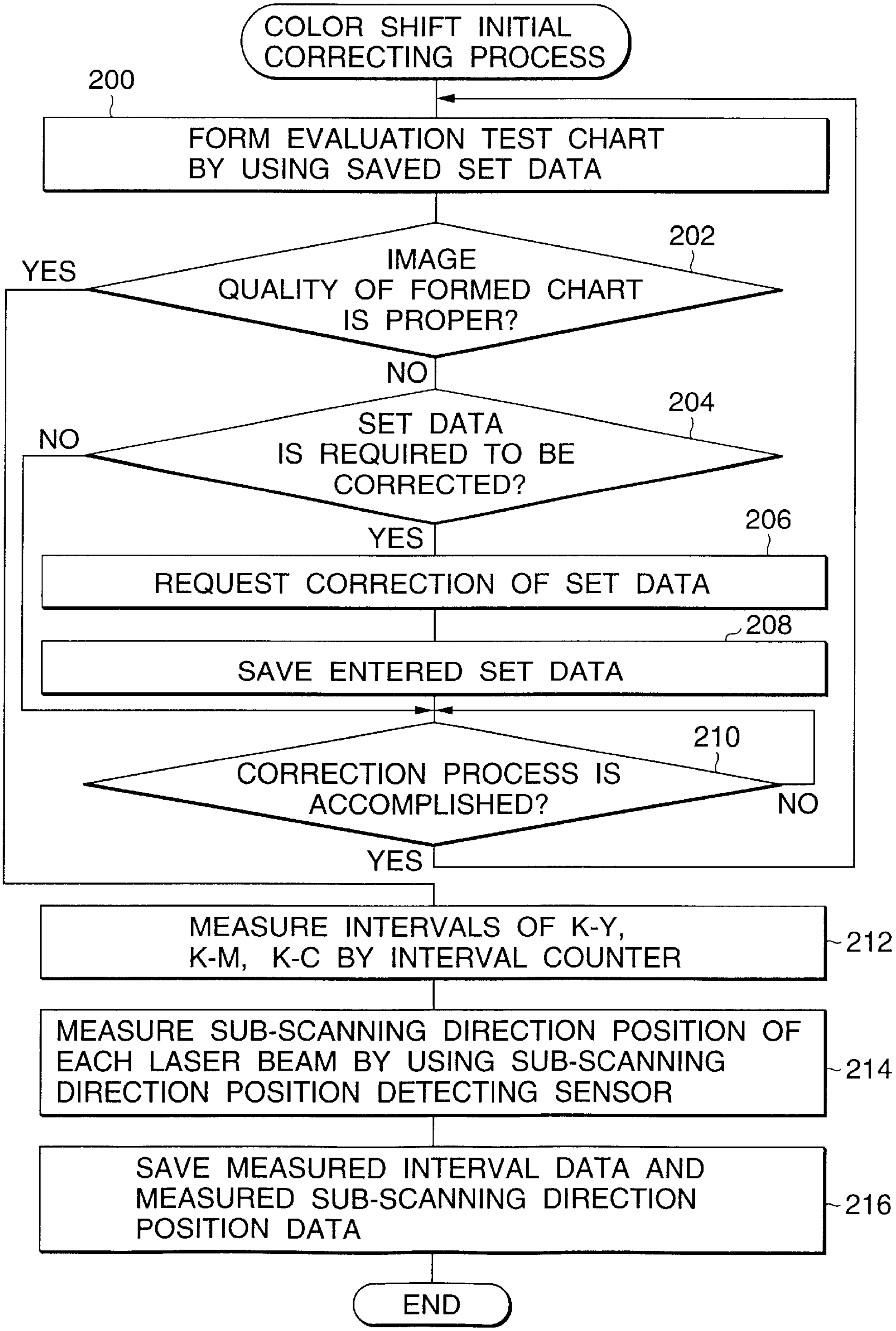
FIG. 14 is a flow chart for describing contents of initial color-shift correcting process operation executed in the case that the plural beam scanning apparatus is mounted on the image forming apparatus, and also when a confirmation is made that an image quality is deteriorated while the image forming apparatus is operated.

Next, the color shift correction (2) is carried out when the plural beam scanning apparatus 30 is mounted on the image forming apparatus 10. As the correction items, a side registration is corrected (2-1); a lead registration is corrected (2-2); a magnification is corrected (2-3); and an inclination of a scanning line is corrected (2-4). Subsequently, the respective correction items (2-1) to (2-4) will be explained with reference to a flow chart for describing an initial color-shift correcting process operation indicated in FIG. 14.

At a step 200, an evaluation test chart used to evaluate a degree of color shifts is formed. In the case that this evaluation test chart is formed, image data of a test chart image is acquired, and this image data is previously stored in a first storage 100A such as a ROM. Also, various sorts of setting data are acquired, and are used to define the modulation timing of the respective laser beams. These setting data are stored into a non-volatile rewritable second storage 100B such as an EEPROM. As these setting data, there are the line sink setting data FDATA(K), FDATA(Y), FDATA(M), FDATA(C); and the magnification setting data VDATA(K), VDATA(Y), VDATA(M), VDATA(C); and furthermore, the page sink setting data SDATA(K), SDATA (Y), SDATA(M), SDATA(C). The respective semiconductor lasers LDs 36 are driven in such a manner that the respective laser beams are modulated based upon the image data of the test chart image at preselected timing corresponding to the acquired setting data.

It should be noted that when the plural beam scanning apparatus 30 is mounted on the image forming apparatus 10 and then the process operation defined at the step 200 is firstly carried out, default values are set to the second storage 100B as the above-explained various sorts of setting data. Also, the line sink setting data among the above-explained various setting data corresponds to a first setting value recited in one embodiment, and the page sink setting data corresponds to a second setting value recited in another embodiment.

The four laser beams projected from the respective LDs 36 are separately deflected by a single rotary polygon mirror 34. The deflected laser beams are projected via the optical components such as the Fθ lens 44 (or 56) and the cylindrical mirror 48 toward the corresponding photosensitive drums 18, and then are scanned on the peripheral surfaces of the photosensitive drums 18 which are charged by the charging device 20. The electrostatic latent images of the test chart image, which are formed on the peripheral surfaces of the photosensitive drum 18 by scanning the laser beams thereon, are developed as toner images having different colors from each other by the developing device 22. A color image (test chart image) is transferred to the transfer member 28, and this color image is formed in such a manner that these different color toner images are overlapped with each other on the belt surface of the transfer belt 14. Then, the transfer member 28 to which this test chart image has been transferred is processed in the fixing process, and thereafter is ejected from the image forming apparatus 10.

At the next step 202, a check is made as to whether or not an image quality of the formed test chart image is proper or not. An operator (assembling worker) visually investigates the test chart image formed on the ejected transfer member 28 so as to check as to whether or not the respective colors K, Y, M, C are made coincident with each other with respect to the respective items, namely (2-1) side registration; (2-2) lead registration; (2-3) magnification; and (2-4) inclination of scanning line. Then, the check results of each of these check items are inputted via the control panel 106.

In such a case that the operator judges that the correction is required as to a specific item (otherwise all items), the judgement result of the step 202 becomes "NO", and the process operation is advanced to a further step 204. Another check is made as to which item among (2-1) side registration, (2-2) lead registration, and (2-3) magnification item is contained in the item which is judged to be corrected. Namely, the operator judges as to whether or not any of the setting data is required to be corrected.

When the judgement result of the step 204 becomes "NO", the process operation is advanced to a step 210. To the contrary, when the judgement result of the step 204 becomes "YES", the process operation is advanced to a step 206. At this step 206, such a message is displayed on the control panel 106, and this message requests the operator to correct the setting data corresponding to the item which is judged to be corrected. Thus, this setting data is corrected by the operator. This correction of the setting data corresponds to the correction of (2-1) side registration; the correction of (2-2) lead registration; and (2-3) magnification.

At the next step 208, the setting data saved in the second storage 100B is updated/stored by the setting data corrected by the operator. As previously explained, the second storage 100B corresponds to a first storage recited in one embodiment and a second storage recited in another embodiment.

At a step 210, a check is made as to whether or not the work by the operator is completed, and the process operation is brought into a waiting state until the judgement result becomes "YES". When the correction of (2-4) scanning line inclination is contained in the item which is judged to be corrected by the operator, the adjusting screw 90 is manipulated based on the test chart image during this judgement, and the angle of the holder 76 of the cylindrical mirror 48 is adjusted to correct the inclination of the scanning trail of the laser beam.

This correction corresponds to the correction of (2-4) scanning line inclination, and when this correction is carried out, the fine adjustment of the scanning line inclination according to this embodiment is performed. As apparent from FIG. 3, since the adjusting screw 90 is exposed outside the casing 32 of the plural beam scanning apparatus 30, while the above-explained adjustment work is carried out, such a cumbersome work is no longer required, and also the adjustment work can be simplified. For instance, it is not required that the lid 50 is removed so as to expose the inside portion of the casing 32.

When the judgement result of the step 210 becomes "YES", the process operation is returned to the previous step 200. As a result, the correction (namely, correction of set data and adjustment of adjusting screw 90) as to the item which is judged to be corrected, and the production of the evaluation test chart are repeatedly carried out until the judgement result of the step 202 becomes "YES", in other words, the respective items of (2-1) side registration, (2-2) lead registration, (2-3) magnification, and (2-4) scanning line inclination are completely corrected.

Figure 16A:
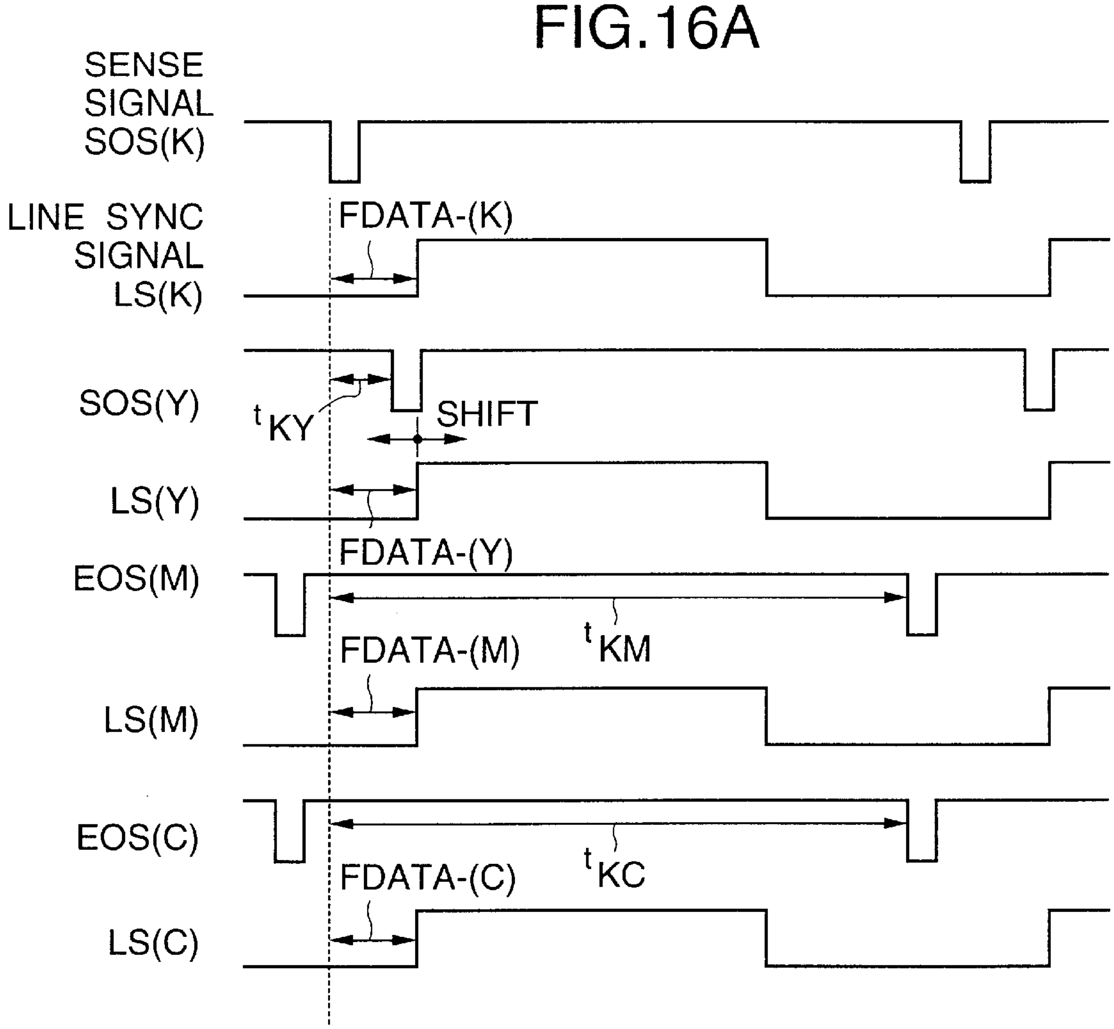
FIG. 16A is a timing chart for explaining a side registration correcting operation executed based upon a sensor output of a main-scanning position detecting sensor.

When the judgement result of the step 202 becomes "YES", the color shift correction is accomplished, and the process operation is advanced to a step 212. The present state is stored at steps after this step 212. That is to say, at the step 212, while the main-scanning position detecting sensor 64K uses the timing for sensing the laser beam K as a reference, the following measurements are carried out: a difference "$t_{KY}$" of timing at which the main-scanning position sensing sensor 64Y senses the laser beam Y; another difference "$t_{KM}$" of timing at which the main-scanning position sensing sensor 64M senses the laser beam M; and another difference "$t_{KC}$" of timing at which the main-scanning position detecting sensor 64C senses the laser beam C (see FIG. 16A).

The measurements of the above-explained timing differences (intervals) may be realized as follows. That is, a sense signal entered into the interval counter 104 is sequentially selected by the selector 102 from the sense signals SOS(Y), EOS(M), EOS(C) outputted from the main-scanning position detecting sensors 64Y, 64M, 64C. A pulse number of sync clock SYN-CLK among the respective intervals is counted by the interval counter 104.

At the next step 214, positions of the laser beams K, Y, M, C along the sub-scanning direction are measured by the sub-scanning position detecting sensors 66K, 66Y, 66M, 66C. Then, at a subsequent step 216, the measurement results of the interval acquired at the step 212 (namely, interval measurement data IDATA(KY), IDATA(KM), IDATA(KC)), and also the measurement results of the beam sub-scanning direction position acquired at the step 214 (namely, sub-direction position measurement data PDATA (K), PDATA(Y), PDATA(M), PDATA(C)) are saved as the initial data into the second storage 100B, and then the initial color-shift correcting process operation is ended.

The color shifts as to the below-mentioned correction items can be corrected by way of the above-explained color shift correction, namely the side registration, the lead registration, the magnification, the inclination of scanning line, and the curve of scanning line. As a consequence, the image forming apparatus 10 may become shipment available state. In the shipped image processing apparatus 10, both the inclination of scanning line and the curve of scanning line are corrected by way of the adjusting screws 90 and 92, and the respective laser beams are modulated at predetermined timing in response to the setting data which have been set by the above-explained initial color-shift correcting process operation. As a result, the side registration, the lead registration, and the magnification of each of the four colors can be made coincident with each other.

However, the arranging positions of the respective optical components which constitute the plural beam scanning apparatus 30 are changed due to a variation in peripheral temperatures of the image forming apparatus 10, and a temperature increase occurred within the image forming apparatus 10, since the operation condition of this image forming apparatus 10 is continued. As a result, the color shift correction is continuously carried out even in the normal operation (3) after the image forming apparatus 10 has been shipped, for example, while the image forming apparatus 10 is being operated, no image forming operation is carried out, i.e., waiting time. At this time, the correction items correspond to (3-1) side registration and (3-2) lead registration.

AUTOMATIC COLOR SHIFT CORRECTING PROCESS OPERATION

Figure 15:
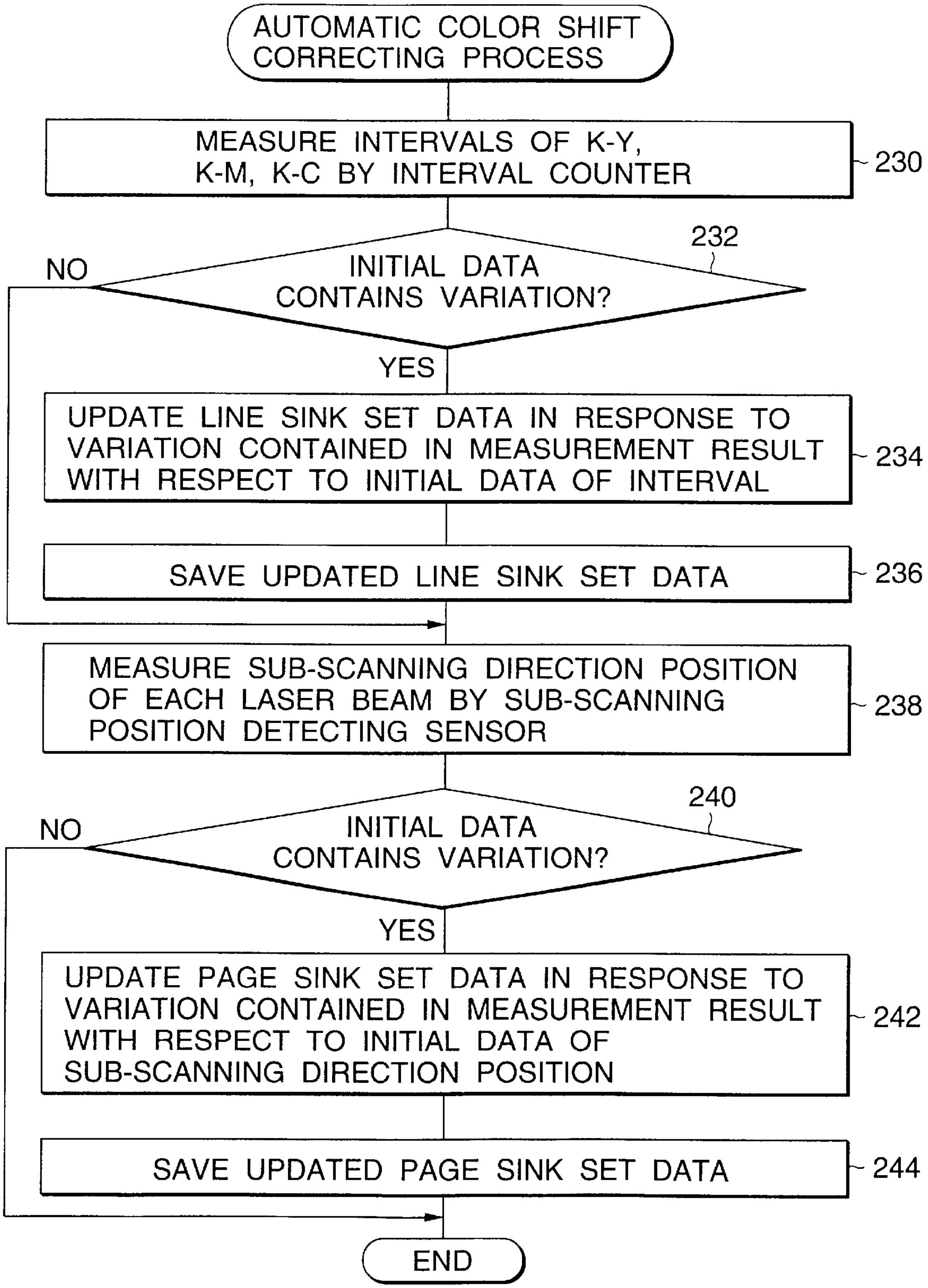
FIG. 15 is a flow chart for explaining contents of automatic color-shift correcting process operation executed while the image forming apparatus is operated.

The corrections for both the above-explained items (3-1) side registration and (3-2) lead registration will now be described with reference to a flow chart for describing an automatic color-shift correcting process operation shown in FIG. 15.

At a first step 230, intervals $t_{KY}$, $t_{KM}$, $t_{KC}$ are measured by the interval counter 104 in a similar manner to the previously explained initial color-shift correcting process operation (see FIG. 14) defined at the step 212. At the next step 232, a judgement is done as to whether or not the interval measured at the step 230 is varied with respective of an interval indicated by the interval measurement data saved as the initial data in the second storage 100B. It should be noted that this judgement corresponds to "a judgement is made as to whether or not there is a variation in a positional relationship among the respective optical beams along the scanning directions" recited in another embodiment. When the judgement result of the step 232 is "NO", no process is performed, and the control goes to step 238.

Figure 16B:
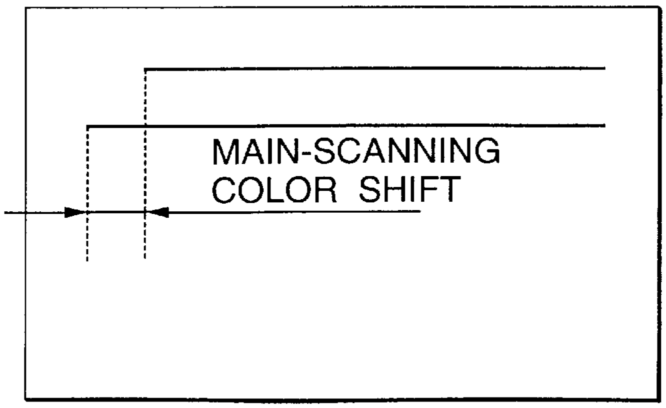
FIG. 16B is an image chart for representing an example of color shifts occurred during main scanning operation.

On the other hand, since the setting data used to define the modulation timing of the laser beam are not yet changed, in the case that the measurement value of the interval is varied, there are certain possibilities that the side registration is shifted every color (refer to "main scanning color shifts" indicated in FIG. 16B) due to some reason. That is, for example, the arranging positions of the optical components which constitute the plural beam scanning apparatus 30 are changed. As a result, when the judgement result of the step 232 becomes "YES", the automatic color-shift correcting process operation is advanced to a further step 234. At this step 234, the line sink setting data is updated with respect to the interval indicated by the initial data in response to the variation contained in the interval measurement result obtained at the step 230.

This update operation of the line sink setting data may be carried out in such a manner that, for example, when the interval $t_{KY}$ is varied, the line sink setting data FDATA(Y) as to laser beam "Y" is updated (in this case, as expressed in "shift" in FIG. 16A, write timing by laser beam "Y" is changed), and while setting the laser beam "K" as a reference, the side registration position for another color is changed. Then, at the next step 236, the updated line sink setting data is saved in the second storage 100B.

The above-explained process operation corresponds to the correction (3-1) of the side registration, and the side registration may be automatically corrected by the feedback control. As a consequence, the laser beams are modulated at such timing in correspondence with the updated line sink setting data in the subsequent image forming process operation, so that it is possible to avoid such a problem. That is to say, the side registration is shifted every color irrespective of the temperature variation. The process operations defined from the step 230 to the step 236 correspond to a modulation controller recited in Claim 3.

It should be noted that the timing when the level of the line sync signal LS is switched is varied with respect to a change in the value of the line sink setting data FDATA while one time period of the sync clock SYN-CLK is used as a unit. As a consequence, the minimum unit of the side registration corresponds to the dot pitch along the main scanning direction. When the time period of the sync clock SYN-CLK is decreased (namely, frequency is increased), the side registration can be apparently adjusted more precisely.

At a subsequent step 238, positions of the laser beams K, Y, M, C along the sub-scanning direction are measured by employing the sub-scanning position detecting sensors 66K, 66Y, 66M, 66C in a similar manner executed in the previously explained initial color-shift correcting process operation (FIG. 14) defined at the step 214. At the next step 240, a judgement is made as to whether or not the sub-scanning direction position of each of the laser beams measured at the step 238 is varied with respect to a sub-scanning direction position. This sub-scanning direction position is indicated by the sub-direction position measurement data which is stored as the initial data in the second storage 100B. This judgement corresponds to "a judgement is made as to whether or not there is a change in positional relationships among the respective optical beams along a direction intersected with the respective scanning directions thereof" recited in Claim 4. When the judgement result of the step 240 is "NO", the automatic color-shift correcting process operation is accomplished.

On the other hand, in such a case that the measurement value of the sub-scanning direction position is varied, there is a certain possibility that the lead registration of every color is shifted because of the following reasons. That is, the arranging positions of the optical components which constitute the plural beam scanning apparatus 30 are varied. As a result, when the judgement result of the step 240 becomes "YES", the process operation is advanced to a step 242. At this step 242, the page sink setting data is updated based upon the variation contained in the sub-scanning direction position measured at the step 238 with respect to the sub-scanning direction position indicated by the initial data.

This page sink setting data can be updated as follows. For instance, while the variation amount of the sub-scanning direction positions as to the laser beam K is used as a reference, a calculation is made of a difference in the variation amount of the sub-scanning direction position as to a predetermined color laser beam, namely, a shift amount of a scanning line of a preselected color laser beam along the sub-scanning direction with respect to the scanning line of the laser beam K. Then, while using the laser beam K as a reference beam, the lead registration position of another color is changed in such a manner that the page sink setting data SDATA of a preselected color is updated by such a value obtained by dividing this calculation result by the scanning line interval along the sub-scanning direction. Then, at the next step 244, the updated line sink setting data is stored into the second storage 100B.

The above-explained process operation corresponds to the correction (3-2) of the lead registration, and the lead registration may be automatically corrected by the feedback control. As a consequence, the laser beams are modulated at such timing in correspondence with the updated page sink setting data in the subsequent image forming process operation, so that it is possible to avoid such a problem. That is to say, the lead registration is shifted every color irrespective of the temperature variation. The process operations defined from the step 238 to the step 244 correspond to a portion of the modulation controller recited in Claim 4.

Figure 5C:
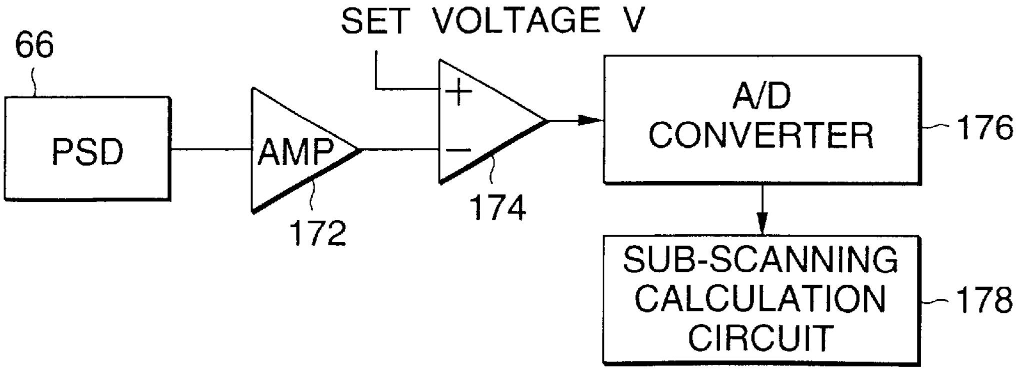
FIG. 5C is a block diagram for indicating an example of a signal processing circuit for the sub-scanning position detecting sensor.

It should be understood that when a process operation executed in response to the sense signal outputted from the sub-scanning position detecting sensor 66 is indicated by a block diagram, this block diagram is shown in FIG. 5C. In other words, a sub-scanning position detecting sensor (PSD) 66 outputs a signal having a voltage level in response to an incident position of a laser beam (sub-scanning direction) to the PSD 66, this voltage signal is amplified by an amplifier 172, and then the amplified voltage signal is entered to a voltage comparator 174. A setting voltage V entered to the voltage comparator 174 corresponds to such a voltage produced in the case that when the laser beam is entered to a preselected position, a voltage signal outputted from the PSD 66 is amplified by the amplifier 172, whereas this voltage comparator 174 outputs a signal which is equal to a shift of a laser beam incident position with respect to the above-explained predetermined incident position. This output signal of the voltage comparator 174 is converted in digital data by an A/D converter 176. Then, this digital data is employed in a calculation of a correction value in the sub-scanning calculating circuit 178.

On the other hand, in the case that there are great changes in installation environments of the image forming apparatus 10, or the relative positions among the photosensitive drums 18K, 18Y, 18M, 18C are largely changed, even when the automatic color-shift correcting process operation is carried out, the color shift cannot be corrected, but therefore the image quality is deteriorated. As previously described, when the image quality is deteriorated (4), the previously-explained initial color-shift correcting process operation (see FIG. 14) is again executed. As a result, the respective items of (4-1) side registration, (4-2) lead registration, (4-3) magnification, and (4-4) scanning line inclination are corrected.

In accordance with this embodiment mode, since the automatic color-shift correcting process operation is continuously carried out when the image forming apparatus 10 is operated, the execution frequencies of the color-shift correcting process operation (4) can be considerably lowered. This color shift is caused by the deterioration in the image quality. It should be understood that all of the above-explained color-shift correcting process operations executed at various timing may be summarized in the below-mentioned table 1.

TABLE 1

| | (1) CORRECTION EXECUTED WHEN SCANNING APPARATUS IS ASSEMBLED | (2) CORRECTION EXECUTED WHEN SCANNING APPARATUS IS MOUNTED ON IMAGE FORMING APPARATUS | CORRECTION EXECUTED AFTER SCANNING APPARATUS IS SHIPPED | |
|---|---|---|---|---|
| | | | (3) UNDER NORMAL STATE | (4) UNDER DETERIORATION IN IMAGE QUALITY |
| SIDE REGISTRATION | | (2-1) SET LINE SINK SETTING DATA | (3-1) FEEDBACK CONTROL | (4-1) SET LINE SINK SETTING DATA |
| LEAD REGISTRATION | (1-1) ADJUSTMENT BY ADJUSTING SCREW (COARSE ADJUSTMENT) | (2-2) SET PAGE SINK SETTING DATA | (3-2) FEEDBACK CONTROL | (4-2) SET PAGE SINK SETTING DATA |
| MAGNIFICATION | | (2-3) SET MAGNIFICATION SETTING DATA | | (4-3) SET MAGNIFICATION SETTING DATA |
| INCLINATION OF SCANNING LINE | (1-2) ADJUST BY ADJUSTING SCREW (COARSE ADJUSTMENT) | (2-4) ADJUST BY ADJUSTING SCREW (FINE ADJUSTMENT) | | (4-4) ADJUST BY ADJUSTING SCREW (FINE ADJUSTMENT) |
| CURVE OF SCANNING LINE | (1-3) ADJUST BY ADJUSTING SCREW (COARSE/FINE ADJUSTMENT) | | | |
| DATA USED IN CORRECTION | OUTPUT FROM CHECKING/MEASURING APPARATUS | EVALUATION TEST CHART | SENSOR OUTPUT WITHIN SCANNING APPARATUS | EVALUATION TEST CHART |

In the above-explained embodiment, while the color K among the four colors K, Y, M, C is employed as the reference color, the modulation timing control is carried out. Alternatively, while other colors are used as the reference color, the modulation timing control may be apparently carried out.

Also, when the plural beam scanning apparatus 30 is assembled, the curves of the scanning lines are corrected in the above-explained embodiment, but the present invention is not limited thereto. Alternatively, even after this plural beam scanning apparatus 30 has been assembled, the curves of these scanning lines may be corrected. In particular, since the adjusting screw 92 for correcting the curved scanning lines is exposed from the plural beam scanning apparatus 30, the correcting operation of the curved scanning lines can be readily carried out.

While the color image forming apparatus according to the present invention has been described in detail, this color image forming apparatus is provided with the first beam sensor and the second beam sensor. The first beam sensor senses the respective positions of the plural optical beams along the optical beam scanning directions, whereas the second beam sensor senses the respective positions of the optical beams along the directions intersected to the optical beam scanning directions. Based upon the sense results obtained from these first and second beam sensor, the color image forming apparatus controls the modulations of the optical beams in such a manner that the positional shifts can be suppressed and these positional shifts are produced when a plurality of images formed by the respective optical beams are synthesized with each other. As a consequence, this color image forming apparatus can own such a superior advantage that while a plurality of images are synthesized with each other to output the synthesized image as a single image, the positional shifts of the plural images can be corrected by the simple arrangement made in low cost.

What is claimed is:

1. An optical scanning apparatus used in an image forming apparatus for scanning a plurality of optical beams on photosensitive members and for synthesizing a plurality of images formed on the photosensitive members to output a synthesized image as a single image, said optical scanning apparatus comprising:

a light source for projecting said plurality of optical beams;

a deflector for deflecting said optical beams;

a first beam sensor for sensing positions of the respective optical beams along an optical beam scanning direction;

a second beam sensor for sensing positions of the respective optical beams along a direction intersected with said scanning direction; and a modulation controller for controlling a modulation of each of said plural optical beams projected from said light source based upon the sense results obtained from said first beam sensor and said second beam sensor in such a manner that a positional shift occurred when a plurality of images formed by said respective optical beams are synthesized with each other is suppressed.

2. An optical scanning apparatus as claimed in claim 1, wherein said optical scanning apparatus further compring:

a first storage for storing thereinto a first set value indicative of modulation starting timing within one scanning time period of each of said optical beams, said first set value being set in such a manner that while using as a reference such timing when a specific optical beam passes through a predetermined position within an optical beam scanning range, the positional shifts of said plural images along said scanning direction are corrected; and said modulation controller controls the modulation starting timing of each of said optical beams within one scanning time period based upon said first set value stored in said first storage while using as the reference said timing when said specific optical beam passes through said predetermined position.

3. An optical scanning apparatus as claimed in claim 2, wherein said modulation controller judges as to whether or not a variation is present in a positional relationship among the respective optical beams along the scanning direction based upon the positions of said optical beams along said scanning direction, sensed by said first beam sensor, and corrects said first set value in response to the variation contained in said positional relationship.

4. An optical scanning apparatus as claimed in claim 1 wherein, said optical scanning apparatus further comprising:

a second storage for storing thereinto a second set value indicative of modulation starting timing while using one scanning of each of said optical beams as a unit, said second set value being set in such a manner that the positional shifts of said plural images along the direction intersected with said scanning direction are corrected; and said modulation controller controls the modulation starting timing while using one scanning of each of said optical beams as a unit based upon said second set value stored in said second storage, and judges as to whether or not a variation is present in a positional relationship among said respective optical beams along the direction intersected with said scanning direction based upon the positions of said respective optical beams along the direction intersected with said scanning direction, sensed by said second beam sensor, whereby said second set value is corrected in response to the variation contained in said positional relationship.

5. An optical scanning apparatus as claimed in claim 1, wherein said deflector for deflecting the optical beams comprises a single rotating deflector.

6. An optical scanning apparatus as claimed in claim 2, wherein said deflector for deflecting the optical beam comprises a single rotating deflector.

* * * * *